United States Patent
Abadi et al.

(10) Patent No.: US 9,495,427 B2
(45) Date of Patent: Nov. 15, 2016

(54) PROCESSING OF DATA USING A DATABASE SYSTEM IN COMMUNICATION WITH A DATA PROCESSING FRAMEWORK

(75) Inventors: Daniel Abadi, Sudbury, MA (US); Kamil Bajda-Pawlikowski, New Haven, CT (US); Azza Abouzied, Halifax (CA); Avi Silberschatz, New Haven, CT (US)

(73) Assignee: Yale University, New Haven, CT (US)

( * ) Notice: Subject to any disclaimer, the term of this patent is extended or adjusted under 35 U.S.C. 154(b) by 277 days.

(21) Appl. No.: 13/032,516

(22) Filed: Feb. 22, 2011

(65) Prior Publication Data
US 2011/0302583 A1    Dec. 8, 2011

Related U.S. Application Data

(60) Provisional application No. 61/396,897, filed on Jun. 4, 2010.

(51) Int. Cl.
  *G06F 17/30*    (2006.01)
(52) U.S. Cl.
  CPC . *G06F 17/30545* (2013.01); *G06F 2209/5017* (2013.01)
(58) Field of Classification Search
  None
  See application file for complete search history.

(56) References Cited

U.S. PATENT DOCUMENTS

| | | | |
|---|---|---|---|
| 5,179,699 A | 1/1993 | Iyer et al. | |
| 7,085,769 B1 | 8/2006 | Luo et al. | |
| 7,957,365 B2 | 6/2011 | Hsu et al. | |
| 7,984,043 B1* | 7/2011 | Waas | 707/718 |
| 8,069,210 B2 | 11/2011 | Gillum et al. | |
| 8,190,610 B2* | 5/2012 | Dasdan et al. | 707/737 |
| 8,418,181 B1* | 4/2013 | Sirota et al. | 718/102 |

(Continued)

FOREIGN PATENT DOCUMENTS

| | | |
|---|---|---|
| WO | WO-2011/153239 A2 | 12/2011 |
| WO | WO-2011/153242 A1 | 12/2011 |
| WO | WO-2013/009503 A2 | 1/2013 |

OTHER PUBLICATIONS

Abouzeid, Azza et al., "HadoopDB: An Architectural Hybrid of MapReduce and DBMS Technologies for Analytical Workloads", Proceedings of VLDB, (2009).

(Continued)

*Primary Examiner* — Aleksandr Kerzhner
*Assistant Examiner* — Tyler Torgrimson
(74) *Attorney, Agent, or Firm* — Mintz Levin Cohn Ferris Glovsky and Popeo, P.C.

(57) ABSTRACT

A system, method, and computer program product for processing data are disclosed. The system includes a data processing framework configured to receive a data processing task for processing, a plurality of database systems coupled to the data processing framework, and a storage component in communication with the data processing framework and the plurality database systems. The database systems perform a data processing task. The data processing task is partitioned into a plurality of partitions and each database system processes a partition of the data processing task assigned for processing to that database system. Each database system performs processing of its assigned partition of the data processing task in parallel with another database system processing another partition of the data processing task assigned to the another database system. The data processing framework performs at least one partition of the data processing task.

40 Claims, 17 Drawing Sheets

(56) References Cited

U.S. PATENT DOCUMENTS

| | | | |
|---|---|---|---|
| 8,543,596 B1* | 9/2013 | Kostamaa et al. | ............ 707/770 |
| 8,555,265 B2 | 10/2013 | Chambers et al. | |
| 2006/0117036 A1 | 6/2006 | Cruanes et al. | |
| 2007/0038659 A1 | 2/2007 | Datar et al. | |
| 2008/0086442 A1 | 4/2008 | Dasdan et al. | |
| 2008/0098370 A1 | 4/2008 | Fontoura et al. | |
| 2008/0120314 A1 | 5/2008 | Yang et al. | |
| 2008/0126397 A1 | 5/2008 | Alexander et al. | |
| 2008/0243908 A1 | 10/2008 | Aasman et al. | |
| 2009/0055370 A1 | 2/2009 | Dagum et al. | |
| 2009/0109857 A1* | 4/2009 | Statia | .................. G06F 11/324 370/241 |
| 2009/0132474 A1 | 5/2009 | Ma et al. | |
| 2009/0271412 A1 | 10/2009 | Lacapra et al. | |
| 2009/0319550 A1 | 12/2009 | Shau et al. | |
| 2010/0083194 A1 | 4/2010 | Bagherjeiran et al. | |
| 2010/0114628 A1 | 5/2010 | Adler et al. | |
| 2010/0241644 A1 | 9/2010 | Jackson et al. | |
| 2010/0241828 A1 | 9/2010 | Yu et al. | |
| 2010/0281166 A1 | 11/2010 | Buyya et al. | |
| 2011/0191361 A1 | 8/2011 | Gupta et al. | |
| 2011/0202534 A1 | 8/2011 | Allerton | |
| 2011/0302151 A1 | 12/2011 | Abadi et al. | |
| 2011/0302226 A1 | 12/2011 | Abadi et al. | |
| 2011/0314019 A1 | 12/2011 | Jimenez Peris et al. | |
| 2011/0320431 A1 | 12/2011 | Jackson et al. | |
| 2012/0310916 A1 | 12/2012 | Abadi et al. | |

OTHER PUBLICATIONS

Chen, Qiming et al., "Efficiently Support MapReduce-Like Computation Models Inside Parallel DBMS", Proceedings of the 2009 International Database engineering & Applications Symposium, Series-Ideas, pp. 43-53, (2009).

Choi, Hyunsik, et al., "Spider", Proceedings of the 18th ACM Conference on Information and Knowledge Management, CIKM, pp. 2087-2088, (2009).

Dean, et al., "MapReduce: Simplified Data Processing on Large Clusters", Communications of the ACM, 51:1 (2008).

Elmasri et al., "Fundamentals of Database Systems", Fourth Edition, (2004).

Gennick, Jonathan, et al., "Oracle SQL*Loader: The Definitive Guide", pp. 1-242 (2001).

Graefe, G., "Query Evaluation Techniques for Large Databases", ACM Computing Surveys, ACM, 25:2, pp. 73-170, (1993).

Guo, Y., et al., "Lubm: A benchmark for owl knowledge base systems," J. Web Sem., 3(2-3):158-182, (2005).

Ideros, S., et al., "Database cracking", CIDR '07, pp. 68-78, (2007).

Ideros, S., et al., "Self-organizing tuple reconstruction in columnstores", SIGMOD '09, pp. 297-30, (2009).

Kossman, D., "The State of the Art in Distributed Query Processing", ACM Computing Surveys, 32:4, pp. 422-469 (2000).

Neumann, T., et al., "The rdf-3x engine for scalable management of rdf data," The VLDB Journal, 19:91-113, (2010).

PeterS@AWS, "Processing and Loading Data from Amazon S3 to the Vertica Analytic Database", http://aws.amazon.com/articles/2571 (2009).

Rohloff, K., et al., "High-performance, massively scalable distributed systems using the mapreduce software framework: The shard triple-store. International Workshop on Programming Support Innovations for Emerging Distributed Applications," (2010).

SPARQL Query Language for RDF, W3C Working Draft 4, (2006).

Stonebraker, Michael et al., "MapReduce and Parallel DBMSs: Friends or Foes?", Communications of the ACM, 53:1, p. 64, (2010).

Yang, Christopher et al., "Osprey: Implementing MapReduce-Style Fault Tolerance in a Shared-Nothing Distributed Database", Data Engineering (ICDE), IEEE 26th International Conference pp. 657-668, (2010).

Ying Yan, et al., "Efficient Indices Using Graph Partitioning in RDF Triple Stores", Data Engineering, 2009, ICDE, IEEE 25th International Conference on Engineering, pp. 1263-1266, (2009).

Zukowski, M., "Balancing Vectorized Query Execution with Bandwidth-Optimized Storage", Ph.D. Thesis, Universiteit van Amsterdam, Amsterdam, The Netherlands, (2009).

International Search Report for PCT/US2012/044981 mailed Apr. 11, 2014.

International Search Report for PCT/US2011/038758 mailed Mar. 14, 2013.

* cited by examiner

PROCESSING OF DATA USING A DATABASE SYSTEM IN COMMUNICATION WITH A DATA PROCESSING FRAMEWORK

CROSS-REFERENCE TO RELATED APPLICATIONS

The present application claims priority to U.S. Provisional Patent Application No. 61/396,897 to Abadi, filed on Jun. 4, 2010, and entitled "An Architectural Hybrid of MapReduce and DBMS Technologies for Analytical Workloads" and incorporates its disclosure herein by reference in its entirety.

TECHNICAL FIELD

The present application generally relates to systems and methods for analytical data management and processing, and in particular, to systems and methods for efficient large-scale data processing.

BACKGROUND

Today, the amount of data that needs to be stored and processed by analytical database systems is exploding. This is partly due to the increased automation with which data can be produced (more business processes are becoming digitized), the proliferation of sensors and data-producing devices, Web-scale interactions with customers, and government compliance demands along with strategic corporate initiatives requiring more historical data to be kept online for analysis. It is no longer uncommon to hear of companies claiming to load more than a terabyte of structured data per day into their analytical database system and claiming data warehouses of size more than a petabyte.

Given the exploding data problem, conventional analytical database systems use database management software ("DBMS") on a shared-nothing architecture (a collection of independent, possibly virtual, machines, each with local disk and local main memory, connected together on a high-speed network). This architecture can scale the best, especially if one takes hardware cost into account. Furthermore, data analysis workloads tend to consist of many large scan operations, multidimensional aggregations, and star schema joins, all of which are easy to parallelize across nodes in a shared-nothing network.

Parallel databases have been proven to scale well into the tens of nodes (near linear scalability is not uncommon). However, there are few known parallel database deployments consisting of more than one hundred nodes and there does not appear to exist a parallel database with nodes numbering into the thousands. There are a variety of reasons why parallel databases generally do not scale well into the hundreds of nodes. First, failures become increasingly common as one adds more nodes to a system, yet parallel databases tend to be designed with the assumption that failures are a rare event. Second, parallel databases generally assume a homogeneous array of machines, yet it is nearly impossible to achieve pure homogeneity at such scale. Third, until recently, there have only been a handful of applications that required deployment on more than a few dozen nodes for reasonable performance, so parallel databases have not been tested at larger scales, and unforeseen engineering hurdles may await.

As the data that needs to be analyzed continues to grow, the number of applications that require more than one hundred nodes is multiplying. Conventional MapReduce-based systems used by Google, Inc., for example, perform data analysis at this scale since they were designed from the beginning to scale to thousands of nodes in a shared-nothing architecture. MapReduce (or one of its publicly available versions such as open source Hadoop (see, e.g., hadoop.apache.org/core)) are used to process structured data, and do so at a tremendous scale. For example, Hadoop is being used to manage Facebook's 2.5 petabyte ($10^{15}$ bytes) data warehouse.

MapReduce processes data that may be distributed (and replicated) across many nodes in a shared-nothing cluster via three basic operations. The MapReduce processing is performed as follows. First, a set of Map tasks are processed in parallel by each node in the cluster without communicating with other nodes. Next, data is repartitioned across all nodes of the cluster. Finally, a set of Reduce tasks are executed in parallel by each node on the partition it receives. This can be followed by an arbitrary number of additional Map-repartition-Reduce cycles as necessary. MapReduce does not create a detailed query execution plan that specifies which nodes will run which tasks in advance; instead, this is determined at runtime. This allows MapReduce to adjust to node failures and slow nodes on the fly by assigning more tasks to faster nodes and reassigning tasks from failed nodes. MapReduce also checkpoints the output of each Map task to local disk in order to minimize the amount of work that has to be redone upon a failure.

MapReduce has a good fault tolerance and an ability to operate in a heterogeneous environment. It achieves fault tolerance by detecting and reassigning Map tasks of failed nodes to other nodes in the cluster (preferably, nodes with replicas of the input Map data). It achieves the ability to operate in a heterogeneous environment via redundant task execution. Tasks that are taking a long time to complete on slow nodes get redundantly executed on other nodes that have completed their assigned tasks. The time to complete the task becomes equal to the time for the fastest node to complete the redundantly executed task. By breaking tasks into small, granular tasks, the effect of faults and "straggler" nodes can be minimized.

MapReduce has a flexible query interface: Map and Reduce functions are just arbitrary computations written in a general-purpose language. Therefore, it is possible for each task to do anything on its input, just as long as its output follows the conventions defined by the model. In general, most MapReduce-based systems (such as Hadoop, which directly implements the systems-level details of MapReduce) do not accept declarative SQL.

One of issues with MapReduce is performance. By not requiring the user to first model and load data before processing, many of the performance enhancing tools listed below that are used by database systems are not possible. Traditional business data analytical processing, that have standard reports and many repeated queries, is particularly, poorly suited for the one-time query processing model of MapReduce. MapReduce lacks many of the features that have proven invaluable for structured data analysis workloads and its immediate gratification paradigm precludes some of the long term benefits of first modeling and loading data before processing. These shortcomings can cause an order of magnitude slower performance than parallel databases.

Parallel database systems support standard relational tables and SQL, and implement many of the performance enhancing techniques, including indexing, compression (and direct operation on compressed data), materialized views, result caching, and I/O sharing. Most (or even all) tables are partitioned over multiple nodes in a shared-nothing cluster;

however, the mechanism by which data is partitioned is transparent to the end-user. Parallel databases use an optimizer tailored for distributed workloads that turn SQL commands into a query plan whose execution is divided equally among multiple nodes. Parallel database systems can achieve high performance when administered by a highly skilled database administrator ("DBA"), who can carefully design, deploy, tune, and maintain the system. However, recent advances in automating these tasks and bundling the software into appliance (pre-tuned and pre-configured) offerings have made these systems less effective. Many conventional parallel database systems allow user defined functions ("UDFs"), although the ability for the query planner and optimizer to parallelize UDFs well over a shared-nothing cluster varies across different implementations.

Parallel database systems generally have a lower fault tolerance and do not operate well in a heterogeneous environment. Although particular details of parallel database systems implementations vary, their historical assumptions that failures are rare events and "large" clusters mean dozens of nodes (instead of hundreds or thousands) have resulted in engineering decisions that make it difficult to achieve these properties. Further, in some cases, there is a clear tradeoff between fault tolerance and performance, and parallel database systems tend to choose the performance extreme of these tradeoffs. For example, frequent check-pointing of completed sub-tasks increase the fault tolerance of long-running read queries, yet this check-pointing reduces performance. In addition, pipelining intermediate results between query operators can improve performance, but can result in a large amount of work being lost upon a failure. Hence, conventional parallel database systems present an inefficient solution to large data analysis.

Thus, there is a need to combine the scalability characteristics of MapReduce and performance and efficiency of parallel databases to achieve a system that can effectively handle data-intensive applications. There is further a need for a data processing system capable of efficiently processing large amounts of data by directing query-processing into higher-performing single-node databases.

SUMMARY

In some embodiments, the current subject matter relates to a data processing system. The system includes a data processing framework configured to receive a data processing task for processing and a plurality of database systems coupled to the data processing framework, wherein the database systems are configured to perform a data processing task. The data processing task is configured to be partitioned into a plurality of partitions and each database system in the plurality of database systems is configured to process a partition of the data processing task assigned for processing to that database system. Each database system in the plurality of database systems is configured to perform processing of its assigned partition of the data processing task in parallel with another database system in the plurality of database systems processing another partition of the data processing task assigned to the another database system. The data processing framework is configured to perform at least one partition of the data processing task. The system also includes a storage component in communication with the data processing framework and the plurality database systems, configured to store information about each partition of the data processing task being processed by each database system in the plurality of database systems and the data processing framework.

In some embodiments, the system also includes a database connector component configured to provide a communication interface between the plurality of database systems and the data processing framework, a data loader component configured to partition data stored in at least one database system and further configured to manage loading of data into the at least one database system, and a data processing interface in communication with the data processing framework and the plurality of database systems and configured to receive and translate the data processing task for processing by at least one of the plurality of database systems and data processing framework.

In some embodiments, the data processing task is a query for processing of data. Upon receipt of the query, the database connector component is configured to connect to at least one database system in the plurality of database systems, execute the received query, and output results of the executed query.

The information stored by the storage component includes size and location of data, size and location of each data partition, and size and location of at least one replica of data. The storage component can be configured to store meta-information about each database system. The meta-information includes information about at least one connection parameter of each database system, information about at least one data set contained within at least one database system, information about location of a replica of data, and information about at least one data partition property of data store in at least one database system. In some embodiments, the plurality of database systems is configured to access the storage component to obtain information for processing of a query. The meta-information can be an XML file.

In some embodiments, each database system in the plurality of database systems is configured to be disposed on a node in a cluster containing a plurality of nodes, wherein each node in the cluster of nodes is configured to communicate with a master node disposed in a data processing framework. The data loader component can be configured to re-partition data being loaded into the cluster into a plurality of partitions corresponding to the plurality of nodes in the cluster, partition each portion in the plurality of partitions into a plurality of smaller partitions for storing in the at least one database system on the at least node, perform bulk-loading of the plurality of smaller partitions of data into the at least one database system on the at least one node.

In some embodiments, the data loader component further includes a global hasher component configured to re-partition the data into the plurality of partitions corresponding to the plurality of nodes in the cluster, and a local hasher component configured to partition each partition in the plurality of partitions into the plurality of smaller partitions using a predetermined maximum smaller partition size.

The current subject matter's system can also includes a query submission interface in communication with the master node and configured to allow submission of a query to the data processing system. Upon receipt of a query, the query processing interface is configured to parse the query, communicate with the storage component to determine a predetermined data storage structure in at least one database system, generate a query execution plan using at least one relational operator, optimize the query execution plan by generating a specific order in which the relational operators process the data and assigning these relational operators to the plurality of database systems or the data processing framework depending on an optimization function, and execute the query in accordance with the optimized query execution plan. At least one relational operator can be configured to process data, where the operator includes a filter operator, a select operator, a join operator, an aggregation operator, and a repartition operator. Each operator is configured to process the data prior to the next operator processing the data. A specific order of relational operator includes processing data using the repartition operator prior to processing data using the join operator.

In some embodiments, the query can be an SQL query. Further, the data processing framework can include a MapReduce framework. In such a case, the query can be a SQL query or a MapReduce job.

In some embodiments, the current subject matter relates to a method for processing data using a data processing system having a data processing framework, a plurality of database systems coupled to the data processing framework, and a storage component in communication with the data processing framework and the plurality database systems. The method includes receiving a data processing task for processing using a data processing framework, partitioning the data processing task into a plurality of partitions, assigning a partition of the data processing task to a database system in the plurality of database systems for processing, using the database systems to which partitions have been assigned for processing, processing the assigned partitions in parallel to one another, processing at least one partition of the data processing task using the data processing framework, and using the storage component, storing information about each partition of the data processing task being processed by each database system in the plurality of database systems and the data processing framework.

In some embodiments, the current subject matter relates to a computer program product, tangibly embodied in a computer-readable medium, the computer program product being operable to cause a data processing system having a data processing framework, a plurality of database systems coupled to the data processing framework, and a storage component in communication with the data processing framework and the plurality database systems. The system is capable of performing at least the following operations: receiving a data processing task for processing using a data processing framework, partitioning the data processing task into a plurality of partitions, assigning a partition of the data processing task to a database system in the plurality of database systems for processing, using the database systems to which partitions have been assigned for processing, processing the assigned partitions in parallel to one another, processing at least one partition of the data processing task using the data processing framework; and using the storage component, storing information about each partition of the data processing task being processed by each database system in the plurality of database systems and the data processing framework.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The current subject matter is described with reference to the accompanying drawings. In the drawings, like reference numbers indicate identical or functionally similar elements.

DETAILED DESCRIPTION

Some of the advantages of the current subject matter's system for processing, managing and analyzing data include high performance and fault tolerance, an ability to run in heterogeneous environments, and a flexible query interface. The current subject matter's system can be capable of achieving performance that is few orders of magnitude higher than conventional systems. Additionally, the system of the current subject matter can be capable of processing complex queries in systems containing plurality of processing nodes and is designed to continue processing a query, without restarting it, even if a node processing that query fails. This is especially advantageous in systems that have a large number of nodes and configured to process enormous amounts of data (e.g., petabytes and more of data).

Another advantage of the current subject matter is its ability to get homogeneous performance across hundreds or thousands of compute nodes, even if each node runs on identical hardware or on an identical virtual machine. This can be useful in situations where nodes suffer from partial failures, software errors, etc., thereby degrading their performance, and hence, reducing homogeneity of node performance and total query execution time. The current subject matter also provides an ability to customize query execution through user-defined functions that can be implemented across nodes in clusters containing a plurality of nodes.

Figure 1:
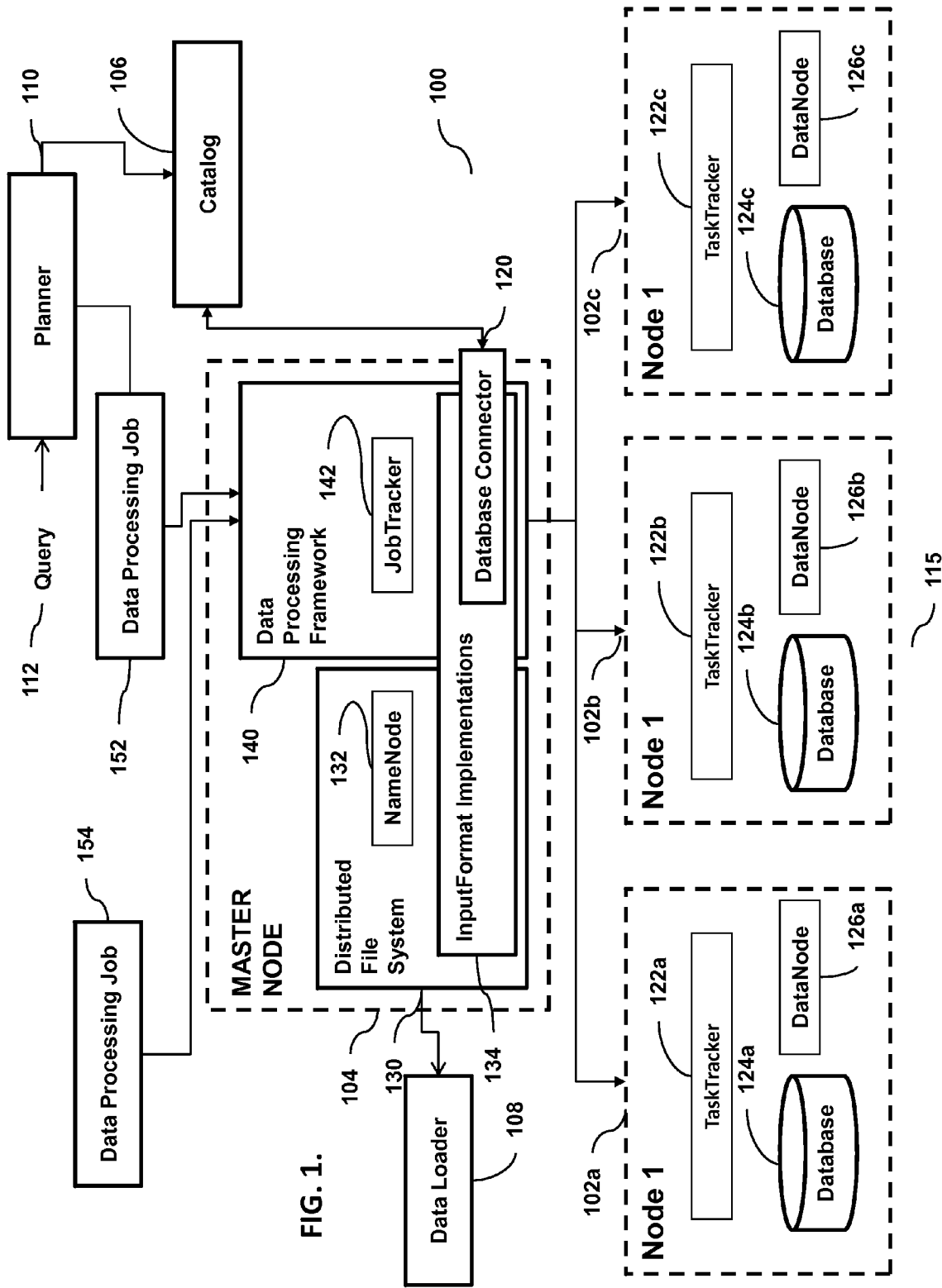
FIG. 1 illustrates an exemplary embodiment of a system for data processing, according to some embodiments of the current subject matter.

FIG. 1 illustrates an exemplary data processing system 100, according to some embodiments of the current subject matter. The system 100 can be configured to connect a plurality of nodes 102 (a, b, c) with a master node 104. A master node 104 may be configured to receive a processing task (e.g., a query) and distribute various processing tasks involved in the query to nodes 102. In some embodiments, the nodes can be configured to be connected using a communication layer (not shown in FIG. 1). In some embodiments, a MapReduce ("MR") framework can be used as such communication layer. As can be understood by one having ordinary skill in the art, other types of frameworks can be used and the current subject matter is not limited to the MR framework. Each node 102 is configured to include a task tracker component 122, a database 124, and a data node 126. As shown in FIG. 1, the system 100 further includes the following components/processing components: a database connector component 120, a catalog component 106, a data loader component 108, and a query execution planning component or planner 110. A query (e.g., an SQL query) for processing on nodes 102 can be received by the planner 110. The planner 112 can be configured to communicate with the master node 104's database processing framework 140 that can be further configured to generate various tasks and pass them onto the nodes 102 for processing, as discussed below. By way of an example. the database processing framework 140 can include a MapReduce framework or any type of framework. As can be understood by one skilled in the art, the current subject matter is not limited to the any particular database processing framework. In some embodiments, a partition of a data processing task can refer to an execution of a series of processing tasks (such as relational operators) on a partition of data (as may be the case for tasks assigned to database systems) or an execution of a series of processing tasks on an entire dataset (as may be the case for a partition assigned to a data processing framework).

In some embodiments, the system 100 can be configured to implement a distributed file system ("DFS") that can be used for connecting multiple single-node database systems and can be configured as a task coordinator and a network communication layer. In some embodiments, received queries can be parallelized across nodes using the framework 140 and the system 100 can be further configured to distribute processing of a query to single-node's databases 124 (a, b, c). For example, upon receipt of a query 112 (or a data processing task), a query execution plan can be generated, whereby the query can be broken up into various partitions, parts and/or tasks, which can be further distributed across the nodes 102 (a, b, c) in a cluster for processing. In some embodiments, such processing can occur in parallel on all nodes 102 that receive a query task. Distribution of tasks can be done based on node availability and capacity. For example, a node cannot receive more data than it can optimally store and/or handle/manage. If data is to be loaded into the database nodes, the data can be broken up/partitioned into a plurality of portions and distributed across nodes based on various factors, including but not limited to, capacity, node's ability to process specific data, etc. Upon distribution of data and/or tasks to independent nodes, each node can be configured to process the tasks/data and the system 100 can be configured to coordinate such processing and node performance (e.g., a job tracker 142 can be configured to coordinate and monitor node-processing and performance). In some embodiments, portions (or partitions) of data/task can be independent of one another, while other portions can require inter-node communication and coordination to process a task. The independent portions might not require such coordination/communication. The catalog storage component 106 can be configured to maintain/track information about each data partition being sent to nodes 102. Through such distribution, use of various scheduling tools, and job tracking, the system 100 can be configured to achieve an excellent fault tolerance and ability to operate in heterogeneous environments. The system 100 can further achieve great performance of parallel databases by processing queries inside engines of databases 124.

Referring back to FIG. 1, system 100 further includes two layers: (i) a data storage layer or a distributed file system ("DFS") 130, and (ii) a data processing layer or framework 140. DFS 130 is shown as a block-structured file system that can be managed by a central name node 132 (shown as "NameNode"). In operation, individual files can be broken into blocks of a predetermined fixed size and distributed across multiple data nodes 102 (a, b, c) in the cluster 115, where the cluster 115 consists of multiple single nodes 102. The name node 132 can be configured to maintain metadata about size and location of blocks and their replicas. As stated above, the catalog component 106 can be further configured to keep track of how and where the data is distributed.

As shown in FIG. 1, the data processing layer 140 follows simple master-slave architecture. The master is the master node 104 that includes a single job tracker 142 contained and the slaves or worker nodes are nodes 102(a, b, c) that include task trackers 122 (a, b, c). The job tracker 142 can handle runtime scheduling of data processing jobs 152, 154 (e.g., MapReduce jobs) and maintain information on each task tracker 122's load and available resources. The task trackers 122 can handle processing of processing of part or all of the data processing jobs that are assigned to them by the job tracker 142. Each processing job can be broken down into various phases, each of which includes a plurality of sub-tasks or sub-phases that perform processing based on the number of data blocks that require such processing. The job tracker 142 assigns tasks/sub-phases to task trackers 122 based on locality and load balancing. Locality can be determined by matching task trackers 122 to appropriate tasks that process data, which is local to them. The job tracker 142 can perform load-balancing by ensuring all available task trackers are assigned tasks. Task trackers 122 regularly update the job tracker 142 with their status through "heartbeat messages." A heartbeat message is a message sent from an origin (i.e., a task tracker) to a destination (i.e., a job tracker) that enables the destination to identify if and when the origin fails or is no longer available.

As shown in FIG. 1, the system 100 further includes an input format implementations library 134 which can be configured to be an interface between the storage layer 130 and the processing layer 140. The input format implementations library 134 can be configured to parse text/binary or other types of files (or connect to arbitrary data sources) and to transform the data into key-value pairs that can be processed during one of the above phases. By way of an example, conventional Hadoop system can be configured to provide several input format implementations including one that allows single JAVA® database connectivity ("JDBC")-compliant database to be accessed by all tasks in one job in a given cluster.

Figure 2:
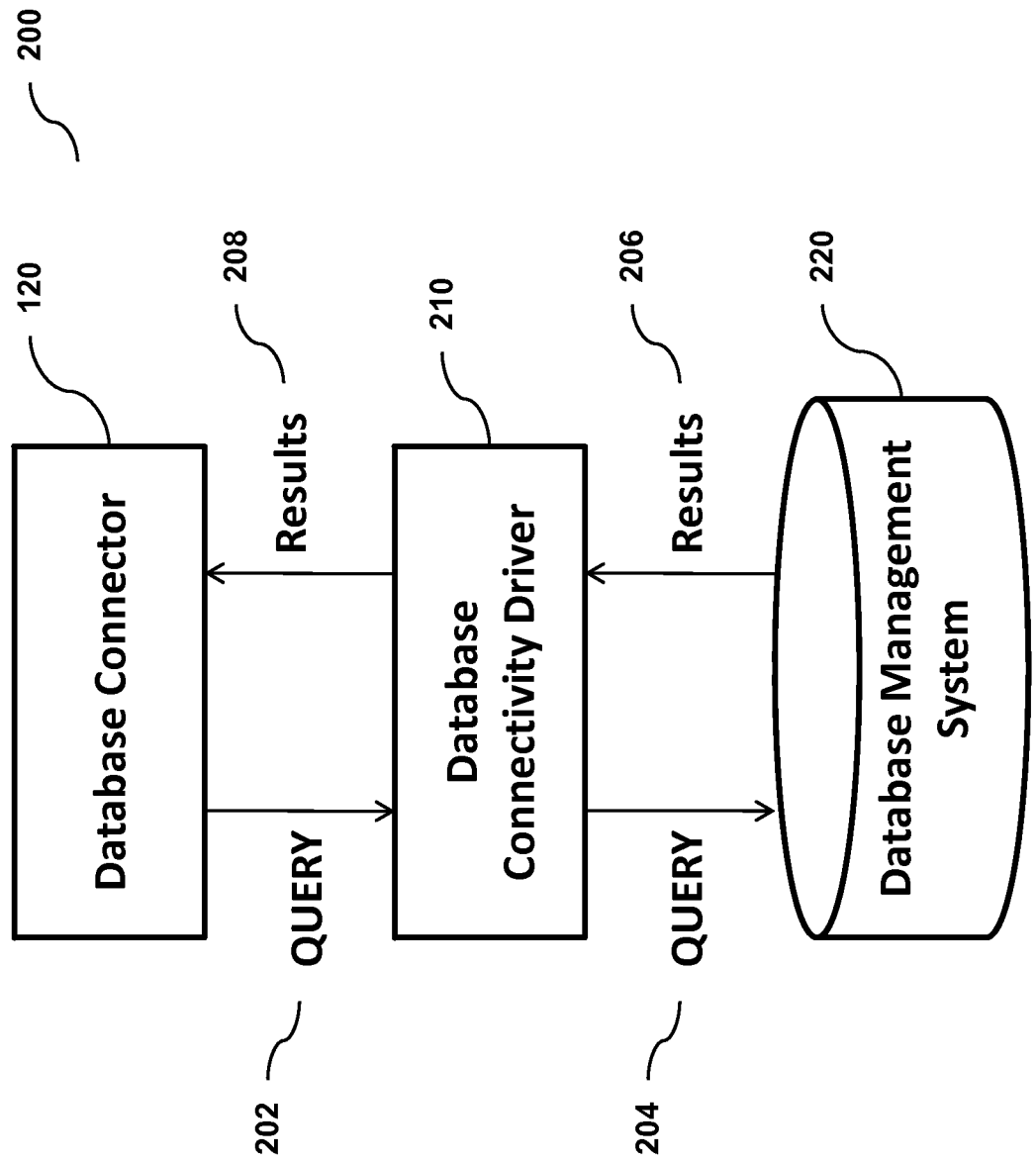
FIG. 2 illustrates an exemplary database connector component of the system shown in FIG. 1, according to some embodiments of the current subject matter.

In some embodiments, the database connector 120 can be configured to provide an interface between database systems 124 residing on nodes 102 in the cluster 115 and task trackers 122. The database connector 120 can be configured to be a part of the input format implementations library 134. In some embodiments, during query (phase, sub-phase, or task) processing/execution the connector 120 receives a data processing query (e.g., an SQL or any other type of programming language query) and appropriate connection parameters, which include, but are not limited to, which drivers to use, query fetch size and other query tuning parameters. The connector 120 is configured to connect to the database 124, execute the query and return results as key-value pairs. In some embodiments, the connector 120 can be configured to connect to any database that resides in the cluster 115. Prior to processing, queries can be configured to be optimized in accordance with requirements of a specific database. In some embodiments, examples of such databases include, but are not limited to, MySQL, PostgreSQL, column-store (i.e., storing content by columns rather than by rows) databases (e.g., open-source, MonetDB, InfoBright, etc.), and other database systems. Other types of database systems can be used with the system 100 and the current subject matter is not limited to the above-referenced database systems. FIG. 2 illustrates an exemplary operation 200 of the database connector 120, according to some embodiments of the current subject matter. As stated above, the database connector can receive a query for processing (e.g., obtaining specific data from a database management system 220, which can include databases 124). The query is initially processed by the database connector 120 and passed on (at 202) to a database connectivity driver 210 (e.g., JAVA® Database Connectivity Driver). The driver 210 then passes (at 204) the query to the database management system 220 for obtaining data requested in the query received by the database connector 120. The database management system 220 returns requested data (at 206) via the database connectivity driver 210 to the database connector 120 (at 208).

In some embodiments, the catalog component 106 can be configured to communicate with the planner 110 and database connector 120. The catalog 106 can be further configured to store meta-information about the databases 124. The information includes, but is not limited to, the following information: (i) connection parameters such as database location, driver class and credentials, (ii) metadata such as data sets contained in the cluster, replica locations, and data partitioning properties. The catalog 106 can be configured to store such meta-information in various formats, such as an XML file, in the DFS 130. This file can be accessed by job tracker 142 and task trackers 122 to retrieve information necessary to schedule tasks and process data needed by a query.

Figure 3:
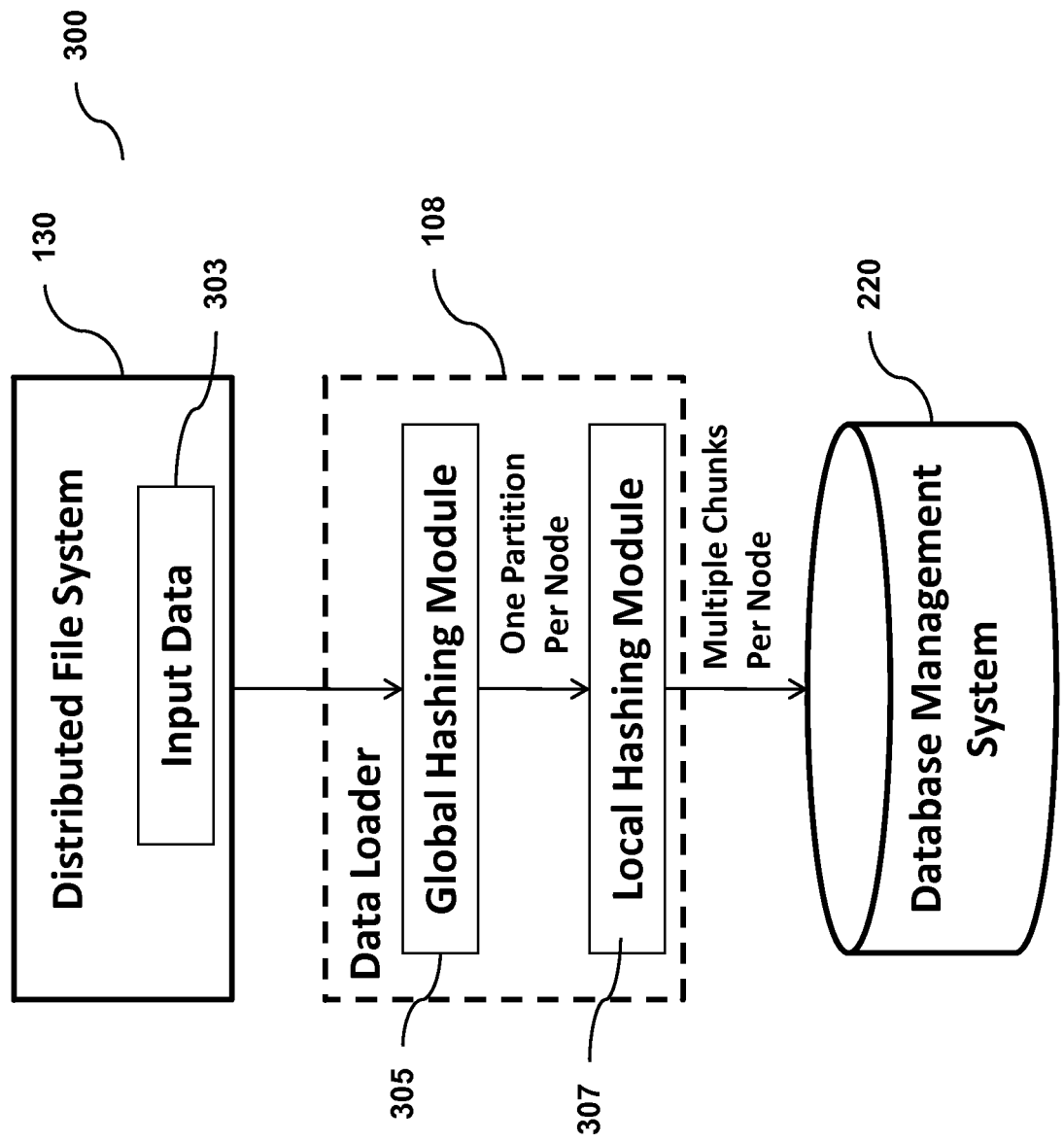
FIG. 3 illustrates an exemplary data loader component of the system shown in FIG. 1, according to some embodiments of the current subject matter.

In some embodiments, the data loader component 108 can be configured to (i) globally repartition data on a given partition key upon loading, (ii) break apart single node data into multiple smaller partitions or chunks and (iii) bulk-load the single-node databases with the chunks. FIG. 3 illustrates an exemplary operation 300 of the data loader component 108 in connection with system 100 shown in FIG. 1. The data loader 108 can include a global hashing component 305 and a local hashing component 307. The global hashing component 305 can be configured to read raw data files or input data 303 stored in the DFS 130 and repartition them into as many portions as there are nodes 102 in the cluster 115. The local hashing component 307 then copies a partition from the DFS 130 into a local file system of each node 102 and secondarily partitions the file into smaller sized chunks based on a predetermined maximum chunk size setting. In some embodiments, the maximum chunk setting can be predetermined by the system 100 or any other factors.

The hashing functions can be used by both the global hashing component 305 and the local hashing component 307 can be configured to be different in order to ensure that the resulting partitioned chunks have a uniform size. Additionally, the hashing functions can be further configured to ensure better load-balancing when executing processing phases/tasks over the stored data. Any hashing functions can be used for the global and/or local hashing components 305, 307.

Figure 4:
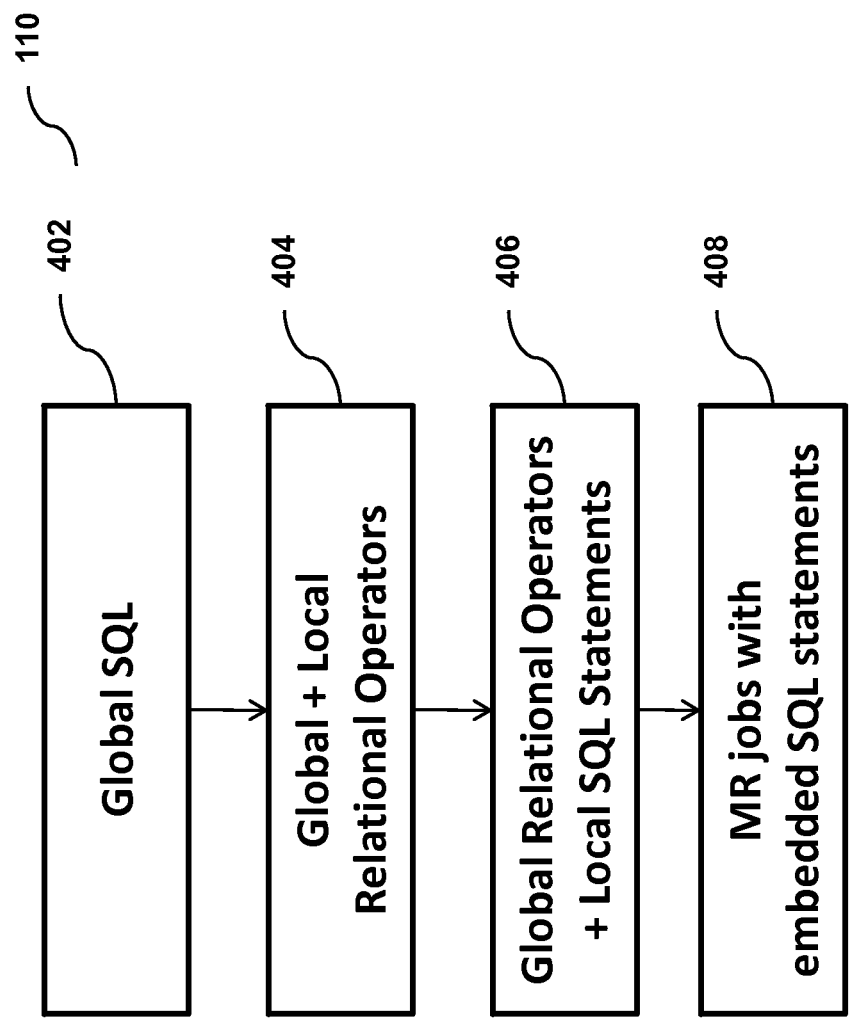
FIG. 4 illustrates an exemplary planner component of the system shown in FIG. 1, according to some embodiments of the current subject matter.

Thus, in some embodiments, the system 100 can be configured to provide a parallel database front-end for query processing purposes via the planner component 110. The planner 110 can be configured to provide an interface for the system 100 and can be further configured to receive a query 112 for further processing by the system 100. The planner 110 can be further configured to perform translation of the query into appropriate format in accordance with requirements of a particular database where data is stored. In some exemplary embodiments, as shown in FIG. 4, the planner 110 can transform SQL quer(ies) (at 402) into global and local relational operators (at 404), which are then transformed into global relational operators and local SQL statements, respectively (at 406), and finally transformed into MapReduce job(s) (at 408). The MapReduce job(s) are then further transformed into SQL language for processing by the nodes in the system 100. In order to process data from the DFS 130, the planner 110 can be configured to implement various relational operators, such as, filter, select (project), join, and aggregation, which operate as iterators: each operator forwards a data tuple to the next operator after processing it (a data tuple is an ordered list of elements). In some embodiments, the DFS 130 can be configured to store data in tables, which can be collocated on a node 102 (some tables can be not collocated). Each table can be stored as a separate file in the DFS 130. The current subject matter can be configured to process all types of tables (including collocated and not collocated tables) and if such tables are partitioned on the same attribute (a common identifier to some elements in the tables), a join operation (i.e., merging of data from tables based on a predetermined join attribute) can be accomplished at the database layer in its entirety.

As stated above, the current subject matter can be configured to push as much query processing as possible into the single-node databases 124 by issuing various processing directive(s) (e.g., SQL or any other programming language statements, commands, functions, etc.). Such processing directives can include selection, projection, and partial aggregation, which can be performed during various phases of a query. Since the current subject matter implements a parallel database processing system, it is capable of providing higher performance due to more efficient operator implementation, better I/O handling, and clustering/indexing provided by its database management system ("DBMS"). Parallel database processing allows for a more efficient processing of co-partitioned tables (e.g., tables that have been hash partitioned on a join attribute) by processing join operations inside the database system of each node. By processing join operations in the database system, joins become local operations (no need to send data over the network) and are performed inside the DBMS which typically implements these operations very efficiently.

Some conventional systems implement "Hive" interfaces (see, e.g., issues.apache.org/jira/browse/HADOOP-3601), where Hive is a data warehouse infrastructure built on top of the Hadoop-MapReduce system. Hive further enables data summarization, adhoc querying and analysis of detail data as well as a mechanism to impose structure on the data. In addition, it also provides a simple query language called QL or HiveQL, which is based on SQL that enables adhoc querying, summarization and data analysis.

In some embodiments, the planner 110 can be configured to extend capabilities of the conventional Hive system. Hive transforms HiveQL into MR jobs that connect to tables stored as files in a Hadoop Distributed File System ("HDFS"). The MR jobs consist of directed acyclic graphs ("DAGs") of relational operators (such as filter, select (project), join, and aggregation) that operate as iterators: each operator forwards a data tuple to the next operator after processing it (where a data tuple is an ordered list of elements). Since each table is stored as a separate file in the HDFS, Hive assumes no collocation of tables on nodes. Therefore, operations that involve multiple tables usually require most of the processing to occur in the Reduce phase of an MR job. Hive is not capable of processing collocated tables. The current subject matter can be configured to process all types of tables (including collocated tables) and if such tables are partitioned on the same attribute (a common identifier to some elements in the tables), a join operation (i.e., merging of data from tables based on a predetermined join attribute) can be accomplished at the database layer in its entirety.

The following discussion illustrates how Hive system creates an executable MR job for an exemplary GroupBy-Aggregation query shown below:

---
select year(saledate), sum(revenue)
from sales group by year(saledate);
---

Figure 5A:
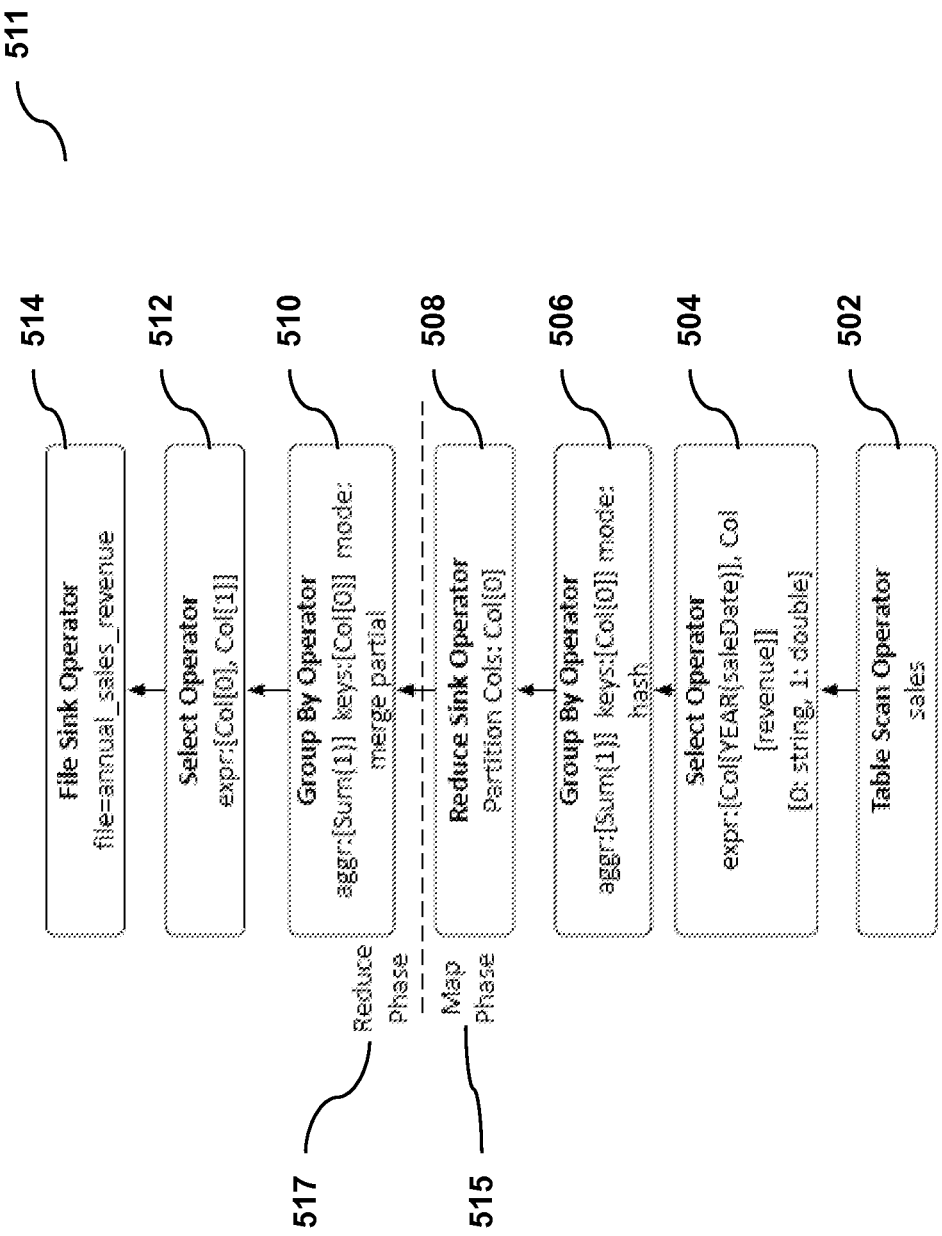
FIGS. 5a-c are flow charts illustrating exemplary execution procedures for a planner component of the system shown in FIG. 1, according to some embodiments of the current subject matter.

Hive processes the above query in a series of phases:
1. A parser transforms the query into an Abstract Syntax Tree.
2. A semantic analyzer connects to Hive's internal catalog, the MetaStore, which stores information about structure of Hive tables (i.e., their attributes), to retrieve the schema of the sales table. It also populates different data structures with meta-information such as the Deserializer and InputFormat classes required to scan the table and extract the necessary fields.
3. A logical plan generator then generates creates a DAG of relational operators, which form the query plan.
4. An optimizer restructures the query plan to create a more optimized plan. For example, it pushes filter operators closer to the table scan operators. A key function of the optimizer is to break up the generated plan into Map or Reduce phases. In particular, it adds a Reparation operator, also known as a Reduce Sink operator, before Join or GroupBy operators. These operators mark the Map and Reduce phases of a query plan. The Hive optimizer is a simple rule-based optimizer. It does not use cost-based optimization techniques. Therefore, it does not always generate efficient query plans. The current subject matter's system 100 can be configured to push as much as possible of the query processing logic into DBMSs that have more sophisticated, adaptive or cost-based optimizers.
5. Finally, a physical plan generator converts the logical query plan into a physical plan executable by one or more MapReduce jobs. The first and every other Reduce Sink operator marks a transition from a Map phase to a Reduce phase of a MapReduce job and the remaining Reduce Sink operators mark the start of new MapReduce jobs. The above SQL query results in a single MapReduce job with the physical query plan illustrated in FIG. 5a. As shown in FIG. 5a, the query can be executed in two phases using a MapReduce job 511: a Map phase 515 and a Reduce phase 517. The Map phase 515 begins with a table scan operator scanning a table (e.g., a sales table), at 502. An operator can be selected to process the table scanned by the table scan operator, at 504. For example, it may be desirous to obtain sales revenue by a particular sale date, as shown at 504. A GroupBy operator (at 506) and a ReduceSink Operator (at 508), discussed above, are applied to the obtained data to complete the Map phase 515 (e.g., each node 104 in the cluster of nodes 115 may have worked on and/or obtained data that was requested by the master node 102). The Reduce phase 517 (in which the master node 102 collects the data obtained by the nodes 104) begins with application of GroupBy operators to the output of the Map phase 515 (at 510). Some data may be aggregated and selected (at 512) for the purposes of delivering final output of the MapReduce job 511 (at 514), which can be an annual sales revenue report that was requested by the original query.
6. Each DAG enclosed within a MapReduce job is serialized into an XML plan. The Hive driver then executes a Hadoop job. The job reads the XML plan and creates all the necessary operator objects that scan data from a table in HDFS, and parse and process one tuple at a time.

In some embodiments, the current subject matter's planner component 110 can be configured to modify operation of the Hive system to create an optimized plan for query execution. The modifications can include the following:
  Before any query execution, the planner 110 can be configured to update the MetaStore with references to tables stored in the databases using the catalog component 106, where the catalog 106 can be configured to store information about table schemas and required deserializer and input format classes.
  Subsequent to the physical query plan generation and before the execution of the data processing jobs, the system 100 can be configured to review the generated physical plan two times as indicated below:
    In the first review, table data fields that are to be processed by the generated plan can be retrieved and table partitioning keys used by the repartition operators can be determined.
    In the second review, the current subject matter's system can traverse the DAG bottom-up from table scan operators to the output or File Sink operator.
All operators, until the first repartition operator with a partitioning key different from the database's key, can be converted into one or more queries and pushed into the database layer. The planner 110 can be configured to use a rule-based generator to recreate programming logic from the relational operators. The query processing logic that can be pushed into the database layer ranges from none to all. In some embodiments, each table can be scanned independently and tuples of data can be pushed one at a time into the DAG of operators.

Figure 5B:
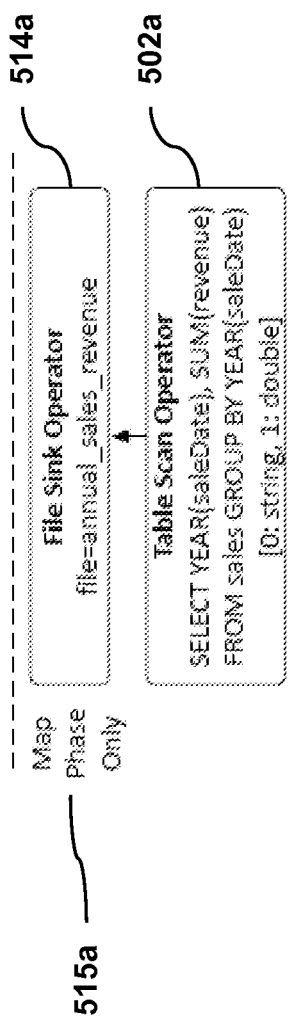
Figure 5C:
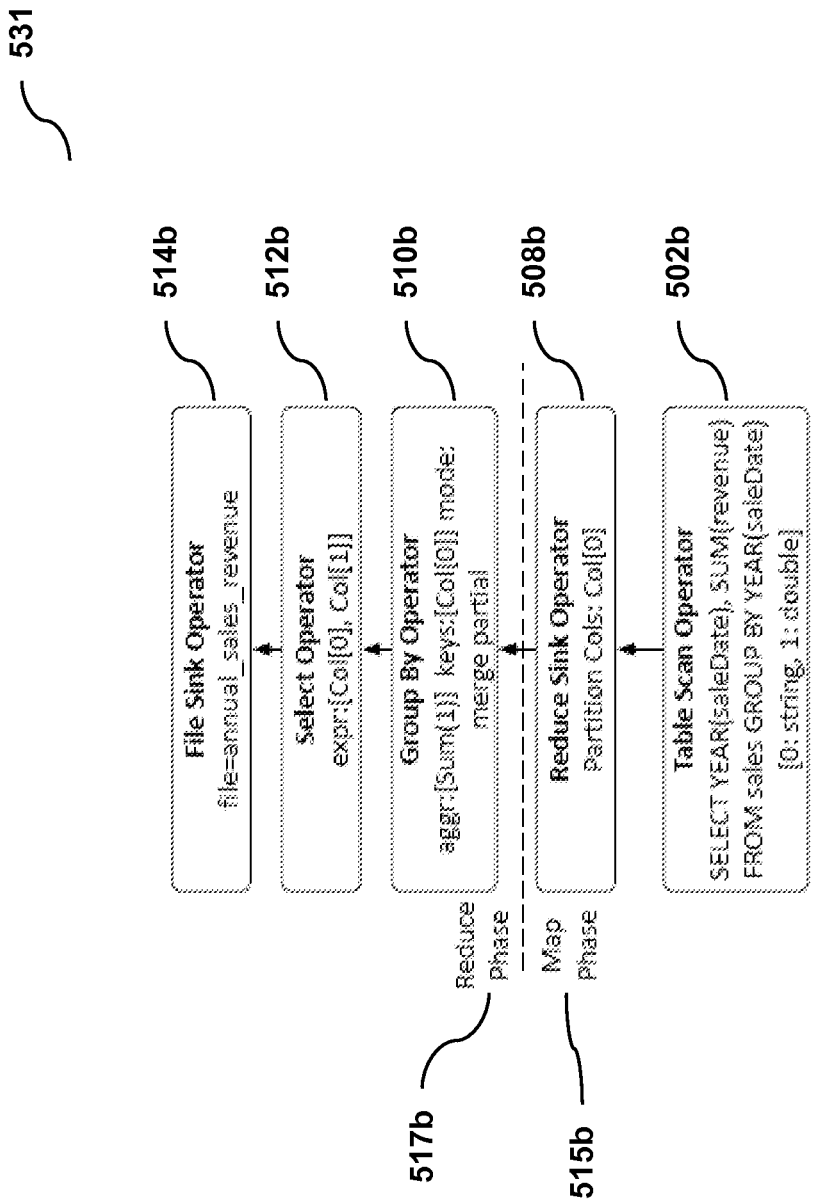

Given the above GroupBy query, the planner 110 can be configured to produce one of the query execution plans shown in FIGS. 5b and 5c. If the sales table is partitioned by YEAR(saleDate), it produces a query plan 521 shown in FIG. 5b. The query plan 521 includes a Map phase 515a, which can begin with a table scan operator scanning the stored table(s) for a particular data (e.g., data can be selected by sales data and revenue as well as can be grouped by a particular date) (at 502a). The query plan 521, then produces an annual sales revenue report (at 514a). This plan can push the entire query processing logic into the database layer. As shown in FIG. 5b, only a single processing task (e.g., if a MapReduce framework is used, then only the Map phase can be used, as shown in FIG. 5b) can be used to output results into a file stored in a distributed file system. In alternate implementations, the planner 110 can be configured to produce a query execution plan 531 shown in FIG. 5c, in which the database layer partially aggregates data and eliminates the selection and the group-by operator used in the Map phase of the Hive generated query plan 511 (as shown in FIG. 5a). The plan 531 can include a Map phase 515b and a Reduce phase 517b. The Map phase 515b can being with a table scan operator scanning for a particular data in a stored data table (e.g., selecting data with regard to a particular sale date and revenue) (at 502b). Once, the data is selected, a ReduceSink operator is applied, as discussed above, and the Map phase 515b is completed (at 508b). During the Reduce phase 517b, the data produced by the Map phase 515b can be aggregated, partially merged (at 510b), selected (at 512b), and further outputted (e.g., in a form of a annual sales revenue report) (at 514b). The final aggregation step in the Reduce phase of the MapReduce job can be configured to merge partial results generated by each node.

For join queries, the conventional Hive system assumes that tables are not collocated. Thus, the Hive generated plan scans each table independently and computes the join after repartitioning data by the join key. In contrast, if the join key matches the database partitioning key, the planner pushes the entire join sub-tree into the database layer.

Figure 15:
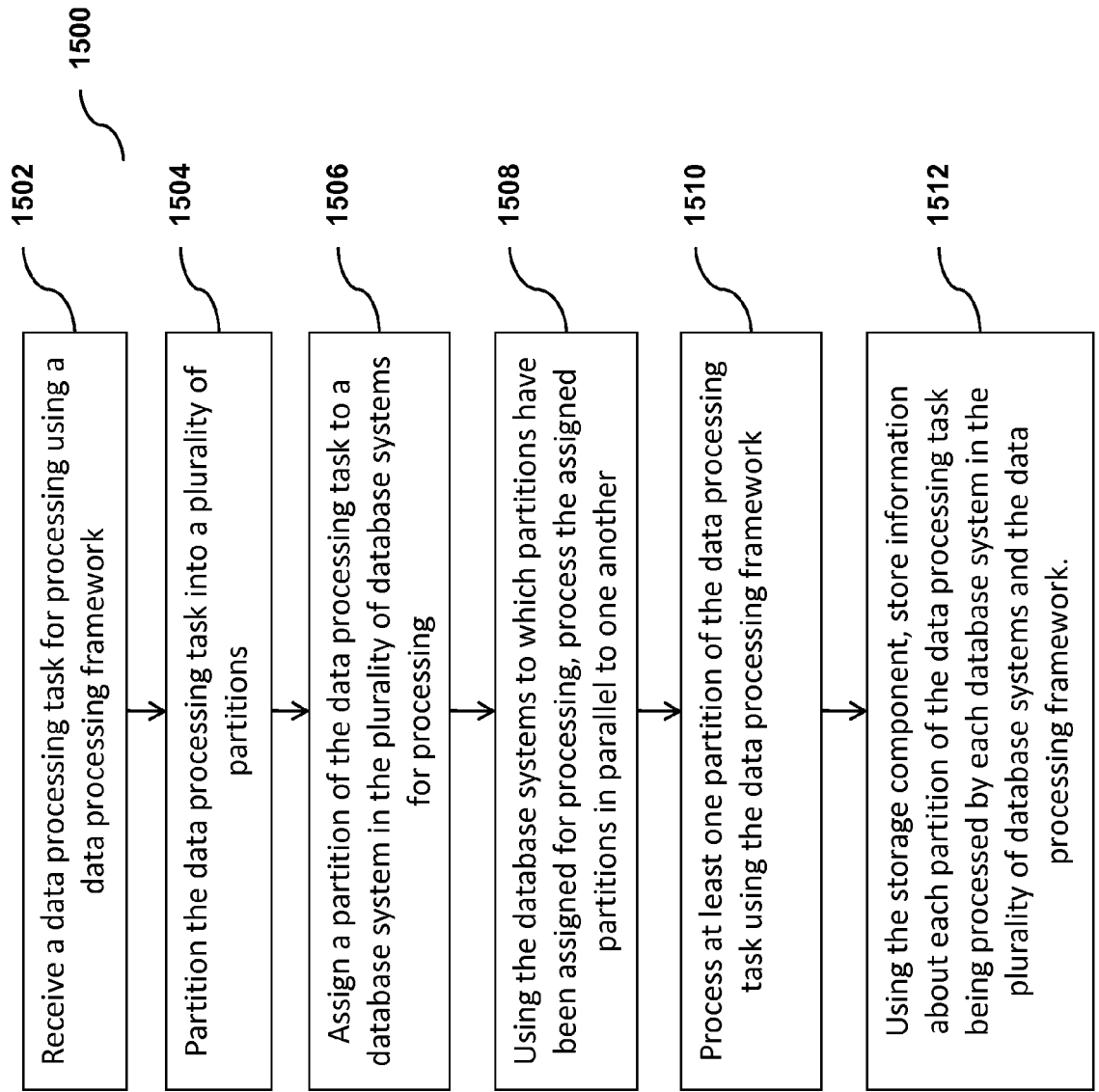
FIG. 15 is a flow chart illustrating an exemplary method, according to some embodiments of the current subject matter.

FIG. 15 illustrates an exemplary method 1500 for processing data using the system shown in FIG. 1, according to some embodiments of the current subject matter.

At 1502, a data processing task is received for processing using the data processing framework (e.g., MapReduce framework). Then, the processing proceeds to 204.

At 1504, the data processing task is portioned into a plurality of partitions. Each partition of the data processing task is assigned to a database system in the plurality of database systems for processing, as shown at 1506.

Using the database systems to which partitions have been assigned for processing, the assigned partitions are processed in parallel to one another, at 1508. As shown at 1510, the data processing framework (e.g., MapReduce framework) is configured to process at least one partition of the data processing task. At 1512, using the storage component, information about each partition of the data processing task being processed by each database system in the plurality of database systems and the data processing framework is being stored.

EXAMPLES

The following is a discussion of various exemplary experiments using current subject matter's system and some conventional systems. As can be understood by one having ordinary skill in the art, these examples are provided here for illustrative purposes and the current subject matter is not intended to be limited by these examples.

In the following experiments, the following systems were evaluated/compared: the current subject matter's system 100 (shown in FIG. 1), a conventional MapReduce system, and two conventional parallel database (DBMS-X, Vertica) systems. The systems were evaluated using five tasks (Grep task, Selection task, Aggregation task, Join task, and UDF Aggregation task) on Amazon Elastic Compute Cloud ("EC2") which is a central part of Amazon.com's cloud computing platform, Amazon Web Services ("AWS"). EC2 allows users to rent virtual computers on which to run their own computer applications and further allows scalable deployment of applications by providing a web service through which a user can boot an Amazon Machine Image to create a virtual machine, which Amazon calls an "instance", containing any software desired. The tasks were run using EC2's "large" instances (zone: us-east-1b). Each instance has 7.5 GB memory, 4 EC2 Compute Units (2 virtual cores), 850 GB instance storage (2×420 GB plus 10 GB root partition) and runs 64-bit platform Linux Fedora 8 OS. FIGS. 3-11 illustrate results of such evaluation.

Once disk space was initialized, input/output (I/O) writes were performed at 86 MB/s. Network speed was approximately 100-110 MB/s. Each task was executed three times and an average of trials was determined. Results from were stored in a file or HDFS, depending on the system evaluated. Cluster sizes of 10, 50, and 100 nodes were used.

In each system, all input and output data was stored in the HDFS without any replication. The data directories were deleted on each node and then the HDFS was reformatted and reloaded to ensure uniform data distribution across all nodes.

Current Subject Matter's System

Current subject matter's system was configured to implement a MapReduce framework and hence, run a Map task. Additionally, on each worker node, PostgreSQL version 8.2.5 was installed. PostgreSQL is an object-relational database management system (ORDBMS), which is open source software. (see, e.g., http://www.postgresql.org). Memory used by the PostgreSQL shared buffers was increased to 512 MB and the working memory size was increased to 1 GB. No data compression was implemented in PostgreSQL.

Hadoop System

The Hadoop system is an open-source version of the MapReduce framework. For these experiments, Hadoop version 0.19.1 running on Java 1.6.0 was used. The system was deployed as follows: data in the HDFS was stored using 256 MB data blocks instead of the default 64 MB. Each MR executor ran with a maximum heap size of 1024 MB; two Map instances and a single Reduce instance were allowed to execute concurrently on each node; more buffer space for file read/write operations was provided (132 MB) and the sort buffer was increased to 200 MB with 100 concurrent streams for merging. Additionally, the number of parallel transfers run by Reduce during the shuffle phase and the number of worker threads for each task tracker's HTTP server was changed to 50.

Vertica System

Vertica is a column-store parallel database system, which means that each attribute of each table is stored (and accessed) separately. Vertica offers a "cloud" edition, which was used in these examples. The Vertica system was configured as follows: all data was compressed, so that this system can operate on compressed data directly.

DBMS-X System

DBMS-X is a commercial parallel row-oriented database system.

Tasks Performed by Each of the Above Systems

As stated above, these systems were subjected to five tasks: a grep task, a selection task, an aggregation task, a join task, and an UDF aggregation task. Each of these tasks and their results are discussed below.

The first task (the "Grep task") required each system to scan through a data set of 100-byte records looking for a three character pattern. This was the only task that required processing largely unstructured data. The other four tasks were more analytical tasks and were related to log-file analysis and HTML document processing. Three of these tasks operated on structured data and the final task operated on both structured and unstructured data. Datasets used by these four tasks included a UserVisits table (models log files of HTTP server traffic), a Documents table (containing 600,000 randomly generated HTML documents), and a Rankings table (containing some metadata calculated over the data in the Documents table). The UserVisits table contained 9 attributes, the largest of which is destinationURL which is of type VARCHAR(100). Each tuple was on the order of 150 bytes wide. The Documents table contained two attributes: a universal resource locator ("URL") or an address of a webpage (VARCHAR(100)) and contents (i.e., content displayed on the webpage or an arbitrary text). The Rankings table contained three attributes: pageURL (i.e., an address of the webpage) (VARCHAR(100)), pageRank (i.e., rank/popularity of the webpage) (INT), and avgDuration (i.e., an average duration of a user visit on the webpage) (INT).

A data generator (e.g., http://database.cs.brown/edu/projects/mapreduce-vs-dbms) yielded 155 million UserVisits records (20 GB) and 18 million Rankings records (1 GB) per node. Since the data generator did not ensure that Rankings and UserVisits tuples with the same value for the URL attribute were stored on the same node, a repartitioning was done during the data load.

Records for both the UserVisits and Rankings data sets were stored in the HDFS as plain text, one record per line with fields separated by a delimiting character. In order to access different attributes at run time, Map and Reduce functions split the record by the delimiter into an array of strings, where the delimiter may be specified by the system's specification.

Data Loading Examples

Figure 6:
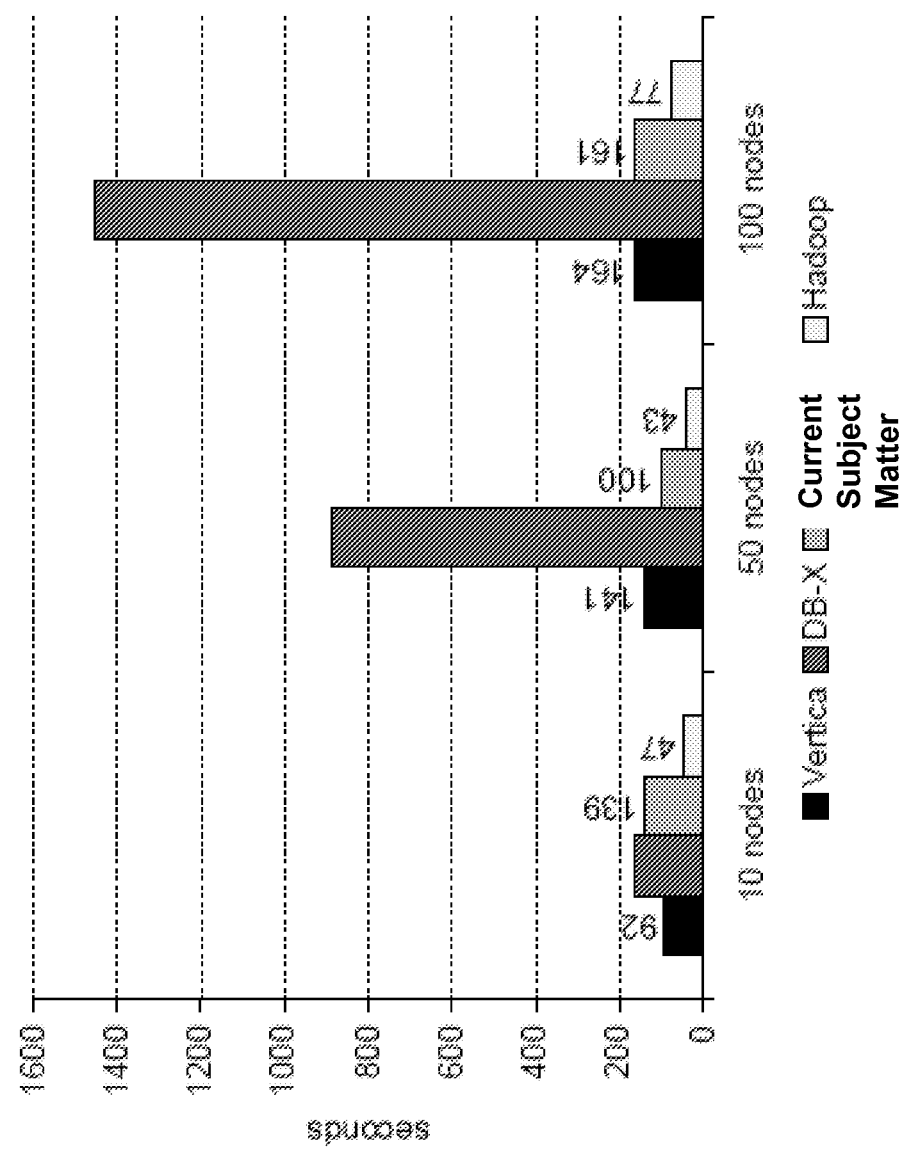
FIGS. 6-14 are plots illustrating comparison of various results of tasks executed by the system shown in FIG. 1 and various conventional systems.
Figure 7:
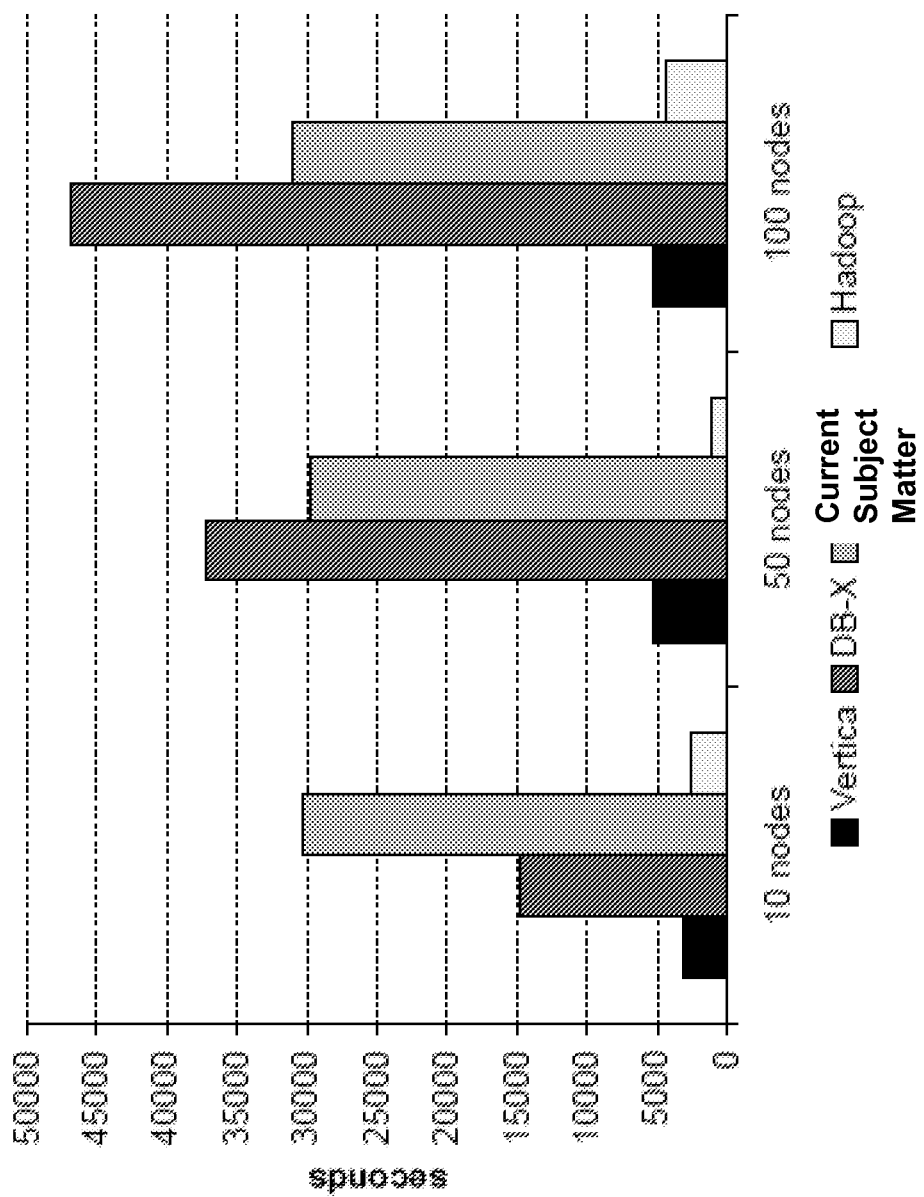

Prior to execution of the tasks, the data was loaded into each system. FIGS. 6 and 7 illustrate loading times for two data sets, Grep and UserVisits, respectively. While grep data was randomly generated and required no preprocessing, UserVisits needed to be repartitioned by destinationURL and indexed by visitDate for all databases during the load in order to achieve better performance on analytical queries. UserVisits can partitioned using the data loader (by applying the global and local hashing functions discussed above). Indexing is a known database technique that can speed up access to database records.

For loading procedure using the current subject matter's system, the maximum chunk size was set to 1 GB. Each chunk was located in a separate PostgreSQL database within a node, and processes SQL queries independently of other chunks. Since the Grep dataset did not require any preprocessing and was only 535 MB of data per node, the entire data was loaded using the standard SQL COPY command into a single chunk on each node.

The Global Hasher partitioned the entire UserVisits dataset across all nodes in the cluster. Next, the Local Hasher on each node retrieved a 20 GB partition from HDFS and hash-partitioned it into 20 smaller chunks, 1 GB each. Each chunk was then bulk-loaded using COPY. Finally, a clustered index on visitDate was created for each chunk.

The load time for UserVisits was broken down into several phases. The first reparation carried out by Global Hasher. It took approximately 14,000 seconds ("s"). Then, local partitioning of the data into 20 chunks took approximately 2500 s, the bulk copy into tables took approximately 5200 s, creating clustered indices, which included sorting, took approximately 7100 s, finally vacuuming the databases took approximately 1200 s. All the steps after global repartitioning are executed in parallel on all nodes. Based on the performed loading, some nodes required as little as 10,000 s to completely load UserVisits after global repartitioning was completed.

An unaltered UserVisits data file was loaded into the Hadoop system. Upon loading, the HDFS automatically broke the file into 256 MB blocks and stored the blocks on a local DataNode. Load time was greatly affected by stragglers. This effect was especially visible when loading UserVisits data set, where a single slow node in the 100-node cluster pushed the overall load time to 4355 s and to 2600 s on the 10-node cluster, despite the average load time of only 1100 seconds per node.

FIGS. 6-14 and the following discussion illustrate results of the five tasks performed by each the above-referenced systems.

Grep Task

Each record used for the Grep task included a unique key in the first 10 bytes, followed by a 90-byte character string. The pattern "XYZ" was searched for in the 90 byte field, and was found once in every 10,000 records. Each node contained 5.6 million such 100-byte records, or roughly 535 MB of data. The total number of records processed for each cluster size was 5.6 million times the number of nodes.

Vertica, DBMS-X, current subject matter's system, and Hadoop(Hive) all executed an identical SQL query:

SELECT*FROM Data WHERE field LIKE '% XYZ %';

None of the systems contained an index in the field attribute. Hence, for all systems, this query required a full table scan and was mostly limited by disk speed.

The current subject matter's system's SMS planner pushed the WHERE clause into the PostgreSQL instances on each node in the cluster.

Hadoop (hand-coded) was executed identically to (a simple Map function that performs a sub-string match on "XYZ"). No Reduce function was needed for this task, so the output of the Map function was written directly to the HDFS.

Figure 8:
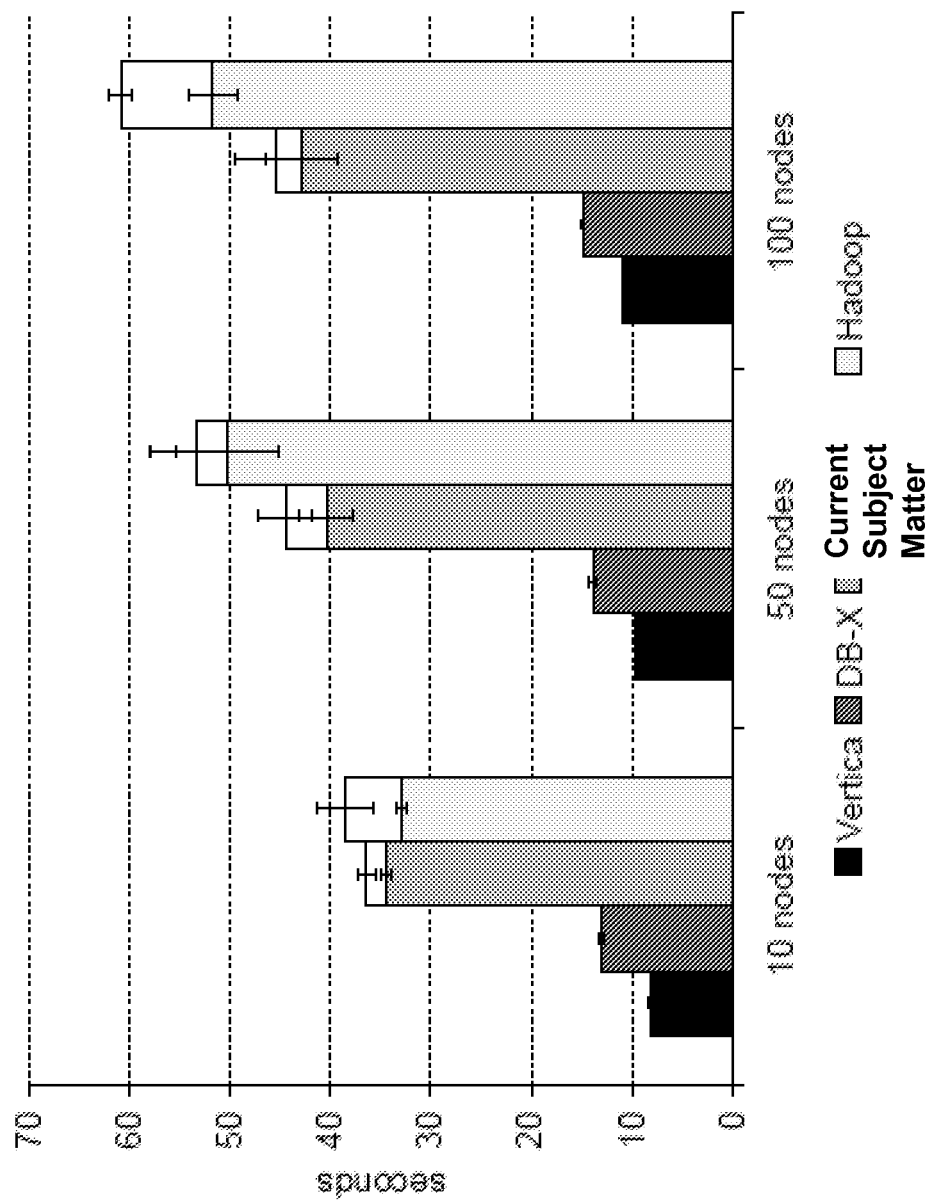

FIG. 8 is a plot illustrating the results of running this task. The current subject matter's system slightly outperformed Hadoop because it handles I/O more efficiently than Hadoop due to the lack of runtime parsing of data. However, both systems were outperformed by the parallel databases systems. This difference was due to the fact that both Vertica and DBMS-X compress their data, thereby reducing time for I/O processing.

Selection Task

The first structured data task evaluated a simple selection predicate on the pageRank attribute from the Rankings table. There were approximately 36,000 tuples on each node that pass this predicate.

Vertica, DBMS-X, current subject matter's system, and Hadoop(Hive) all executed an identical SQL query:

SELECT pageURL, pageRank FROM Rankings WHERE pageRank >10;

The current subject matter's system's SMS planner pushed the selection and projection clauses into the PostgreSQL instances.

Hadoop (hand-coded) was executed as follows: a Map function parsed Rankings tuples using the field delimiter, applied the predicate on pageRank, and outputted the tuple's pageURL and pageRank as a new key/value pair if the predicate succeeds. This task did not require a Reduce function.

Figure 9:
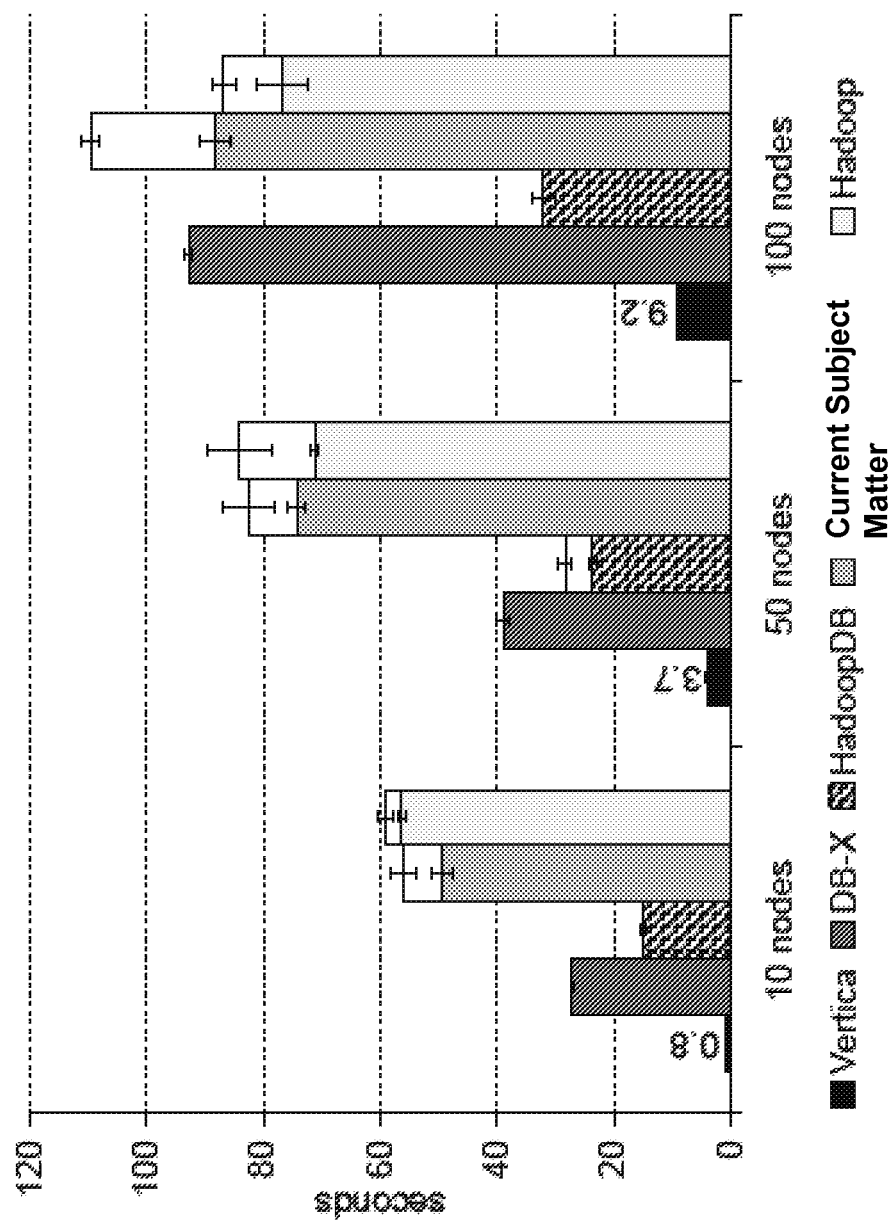

The performance of each system is illustrated in FIG. 9. Hadoop (with or without Hive) performed a brute-force, complete scan of all data in a file. The other systems, however, benefited from using clustered indices on the pageRank column. Hence, the current subject matter's system and the parallel DBMSs outperformed Hadoop.

Since data was partitioned by UserVisits destinationURL, the foreign key relationship between Rankings pageURL and UserVisits destinationURL caused the Global and Local Hasher to repartition Rankings by pageURL. Each Rankings chunk was only 50 MB (collocated with the corresponding 1 GB UserVisits chunk). The overhead of scheduling twenty Map tasks to process only 1 GB of data per node significantly decreased current subject matter's system's performance.

An additional, non-chunked copy of the Rankings table containing the entire 1 GB was maintained for this task. The current subject matter's system outperformed Hadoop system on this dataset, because the use of a clustered index on pageRank eliminated the need to sequentially scan the entire data set. The current subject matter's system scaled better relative to DBMS-X and Vertica mainly due to increased network costs of these systems which dominate when query time is otherwise very low.

Aggregation Task

This task involved computing the total adRevenue generated from each sourceIP in the UserVisits table, grouped by either the seven-character prefix of the sourceIP column or the entire sourceIP column. Unlike the previous tasks, this task required intermediate results to be exchanged between different nodes in the cluster (so that the final aggregate can be calculated). When grouping on the seven-character prefix, there were 2000 unique groups. When grouping on the entire sourceIP, there were 2,500,000 unique groups.

Vertica, DBMS-X, the current subject matter's system, and Hadoop(Hive) all executed identical SQL queries:

---

Smaller query:
    SELECT SUBSTR(sourceIP, 1, 7), SUM(adRevenue)
    FROM UserVisits GROUP BY
    SUBSTR(sourceIP, 1, 7);
Larger query:
    SELECT sourceIP, SUM(adRevenue) FROM UserVisits
    GROUP BY sourceIP;

---

The SMS planner of current subject matter's system pushed the entire SQL query into the PostgreSQL instances. The output was then sent to Reduce jobs inside Hadoop that performed the final aggregation (after collecting all pre-aggregated sums from each PostgreSQL instance).

Hadoop (hand-coded) was executed as follows: a Map function outputted the adRevenue and the first seven characters of the sourceIP field (or the whole field in the larger query) which were sent to a Reduce function which performed the sum aggregation for each prefix (or sourceIP).

Figure 10:
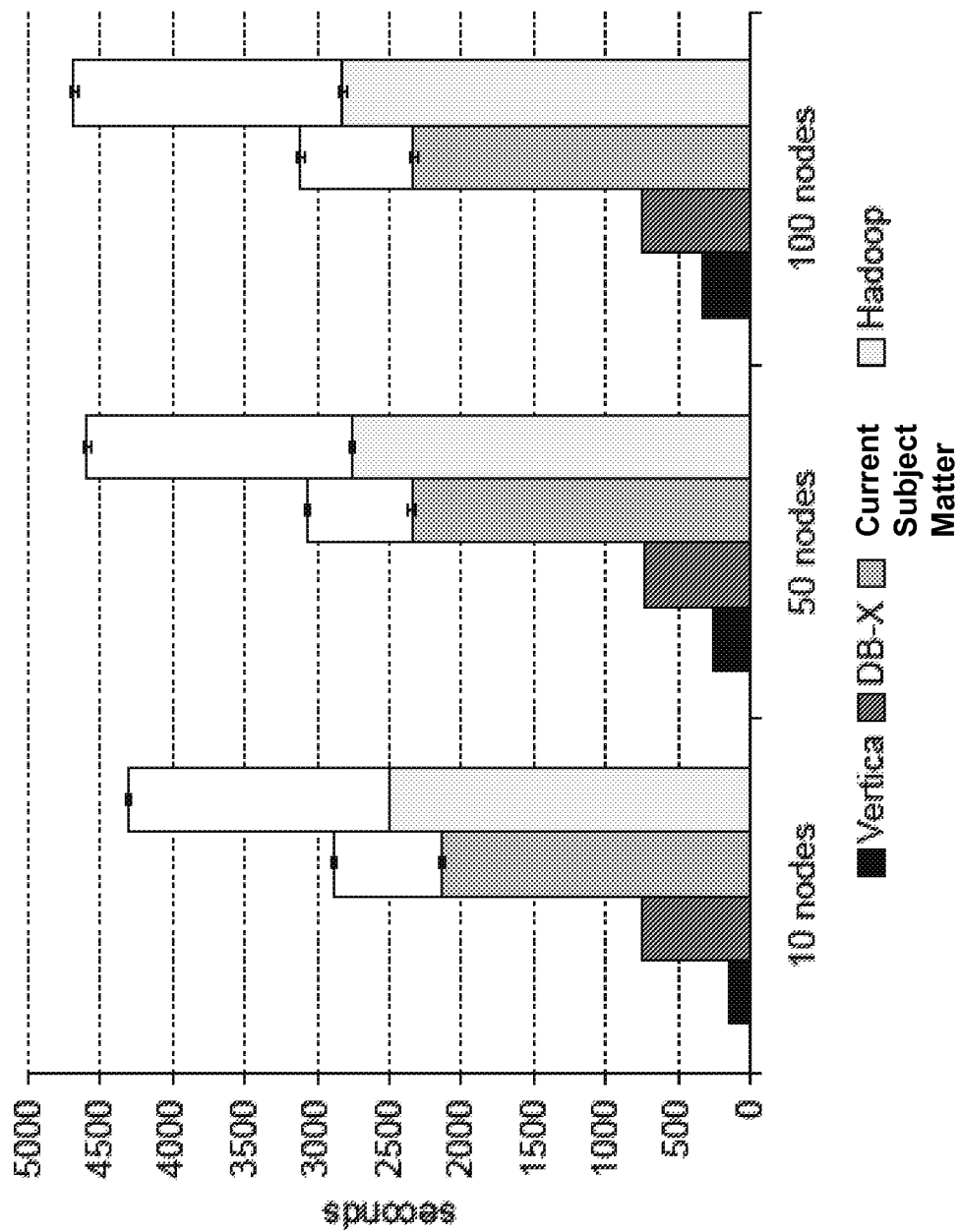
Figure 11:
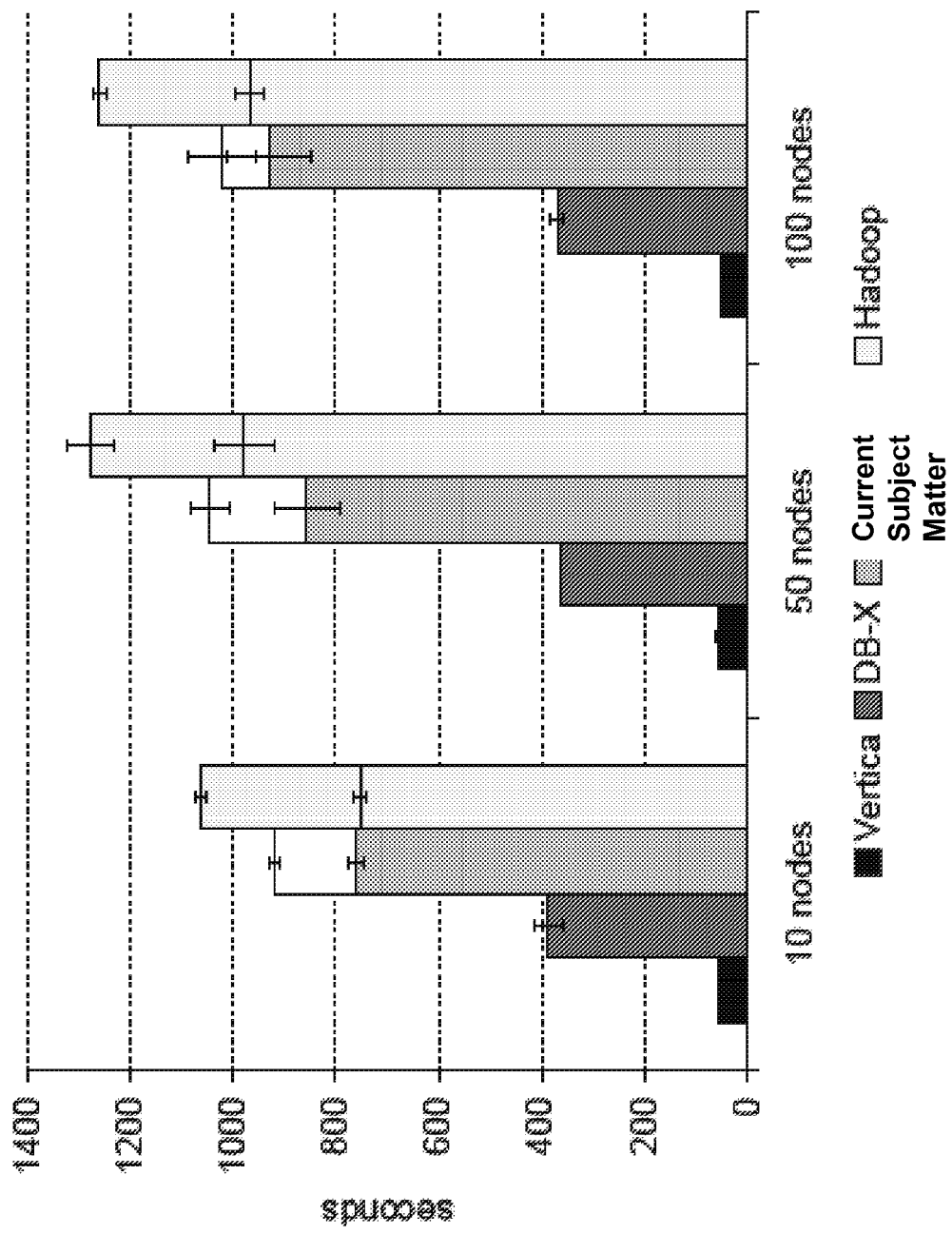

FIGS. 10 and 11 are plots illustrating performance of each of the above systems and correspond to the smaller and larger queries (discussed above), respectively. Similar to the Grep task, these queries were limited by reading data off disk. Thus, both commercial systems benefited from compression and outperformed current subject matter's system and Hadoop.

Hive performed better than Hadoop because it used a hash aggregation execution strategy (it maintains an internal hash-aggregate map in the Map phase of the job), which proved to be optimal when there is a small number of groups (the time taken by Hive is represented by the lower part of the Hadoop bar in FIG. 11). In the large aggregation task, Hive switched to sort-based aggregation upon detecting that the number of groups was more than half the number of input rows per block. In contrast, the hand-coded Hadoop failed to take advantage of hash aggregation for the smaller query because of sort-based aggregation.

These results illustrate the benefit of exploiting optimizers present in database systems and relational query systems like Hive, which can use statistics from the system catalog or simple optimization rules to choose between hash aggregation and sort aggregation.

Unlike Hadoop's Combiner, which is a procedure responsible for local pre-aggregation of data right after the Map phase and before sending data to the Reduce phase, Hive serializes partial aggregates into strings instead of maintaining them in their natural binary representation. Hence, Hive performs much worse than Hadoop on the larger query.

PostgreSQL chooses to use hash aggregation for both tasks as it can easily fit the entire hash aggregate table for each 1 GB chunk in memory. Hence, current subject matter's system outperforms Hadoop on both tasks due to its efficient aggregation implementation.

This query is well-suited for systems that use column-oriented storage, since the two attributes accessed in this query (sourceIP and adRevenue) consist of only 20 out of the more than 200 bytes in each UserVisits tuple. Vertica was thus able to significantly outperform the other systems due to the commensurate I/O savings.

Join Task

The join task involved finding an average pageRank of the set of pages visited from the sourceIP that generated the most revenue during a particular period of time (e.g., the week of Jan. 15-22, 2000). A difference between this task and the previous tasks was that it read in two different data sets and joined them together (pageRank information is found in the Rankings table and revenue information is found in the UserVisits table). There are approximately 134,000 records in the UserVisits table that have a visitDate value inside the requisite date range.

In current subject matter's system, the selection, join, and partial aggregation was pushed into the PostgreSQL instances using the following SQL query:

---

SELECT sourceIP, COUNT(pageRank), SUM(pageRank),
SUM(adRevenue) FROM     Rankings AS R, UserVisits AS UV
WHERE R.pageURL = UV.destURL AND
UV.visitDate BETWEEN '2000-01-15' AND '2000-01-22'
GROUP BY UV.sourceIP;

---

A single Reduce task in Hadoop that gathered all of the partial aggregates from each PostgreSQL instance was used to perform the final aggregation.

Although Hadoop has support for a join operator, this operator requires that both input datasets be sorted on the join key. Such a requirement limits the utility of the join operator since in many cases, including the query above, the data is not already sorted and performing a sort before the join adds significant overhead. If the input data is sorted (and did not include the sort time in total query time), query performance using the Hadoop join was lower than query performance using the three phase MR program used in that used standard 'Map' and 'Reduce' operators.

Figure 12:
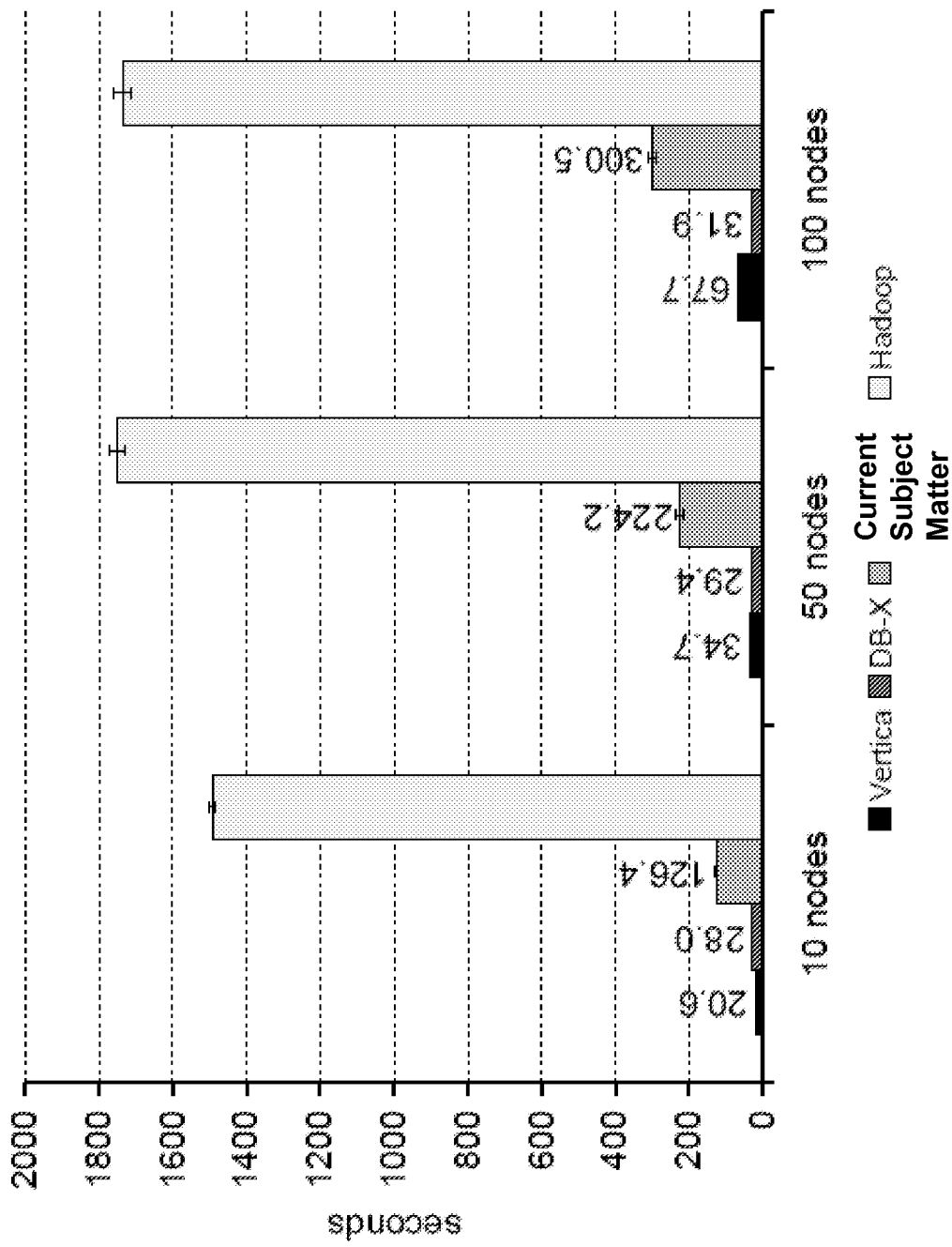

FIG. 12 is a plot summarizing the results of this task. Hadoop's performance was limited by completely scanning the UserVisits dataset on each node in order to evaluate the selection predicate.

The current subject matter's system, DBMS-X, and Vertica all achieved higher performance by using an index to accelerate the selection predicate and having native support for joins. These systems had slight performance degradation with a larger number of nodes due to the final single node aggregation of and sorting by adRevenue.

UDF Aggregation Task

In this task, for each document, the number of inward links from other documents in the Documents table was computed. URL links that appeared in every document were extracted and aggregated. HTML documents were concatenated into large files for Hadoop (256 MB each) and Vertica (56 MB each) at load time. The current subject matter's system was able to store each document separately in the Documents table using the TEXT data type. DBMS-X processed each HTML document file separately, as discussed below.

The parallel databases used a user-defined function, F, to parse the contents of each document and emit a list of all URLs found in the document. A temporary table was populated with this list of URLs and then a simple count/group-by query was executed finding the number of instances of each unique URL.

Implementation of a UDF inside parallel database systems is difficult. In DBMS-X, the UDF was implemented inside the DBMS, but the data was stored in separate HTML documents on the raw file system and the UDF made external calls accordingly. Vertica does not support UDFs, so a simple document parser was written in Java externally to the DBMS. This parser was executed on each node in parallel, parsing the concatenated documents file and writing the found URLs into a file on the local disk. This file was then loaded into a temporary table using Vertica's bulk-loading tools and a second query was executed that counts, for each URL, the number of inward links.

Hadoop employed a standard TextInputFormat and parsed each document inside a Map task, outputting a list of URLs found in each document. Both a Combine and a Reduce function sum the number of instances of each unique URL.

Figure 13:
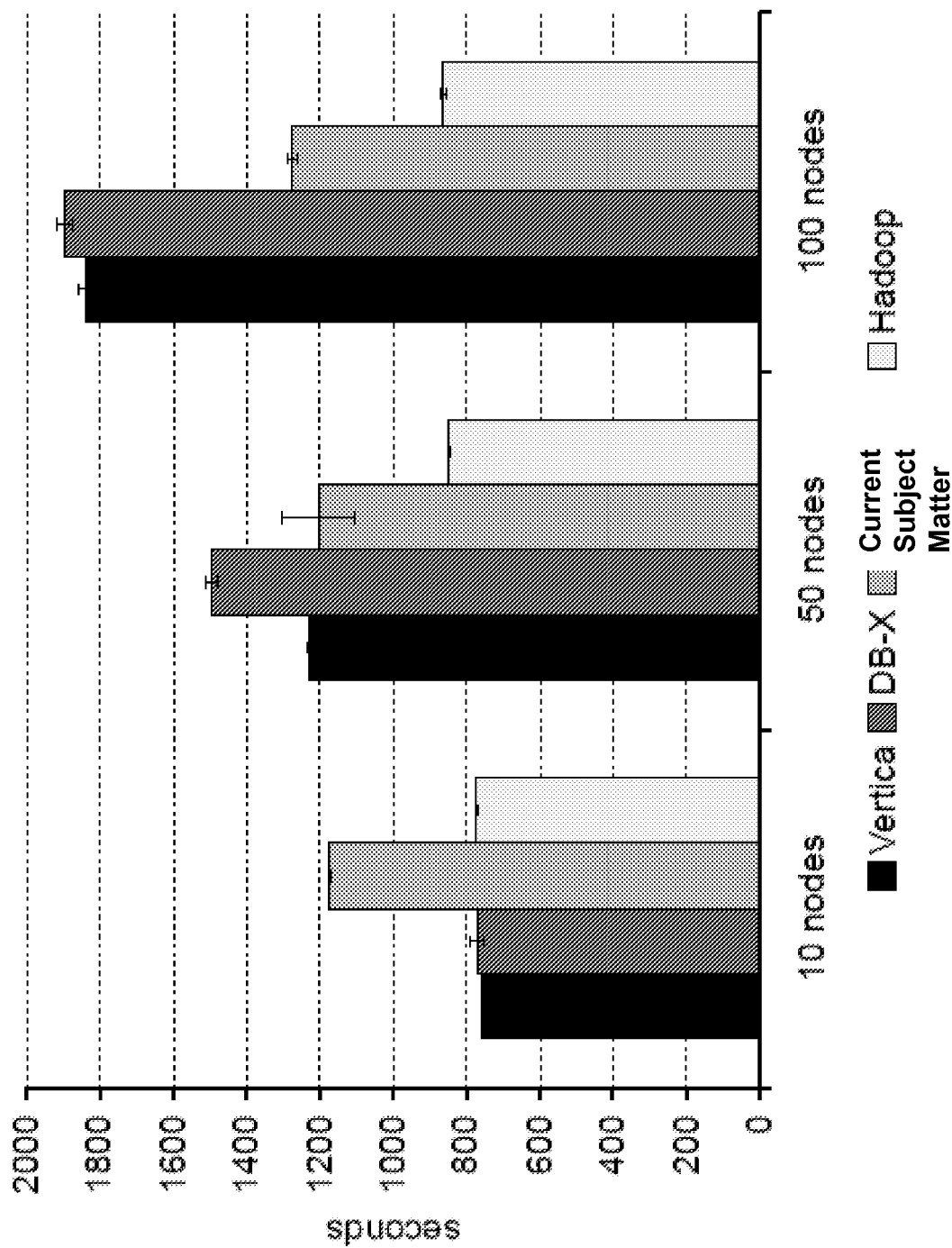
Figure 14:
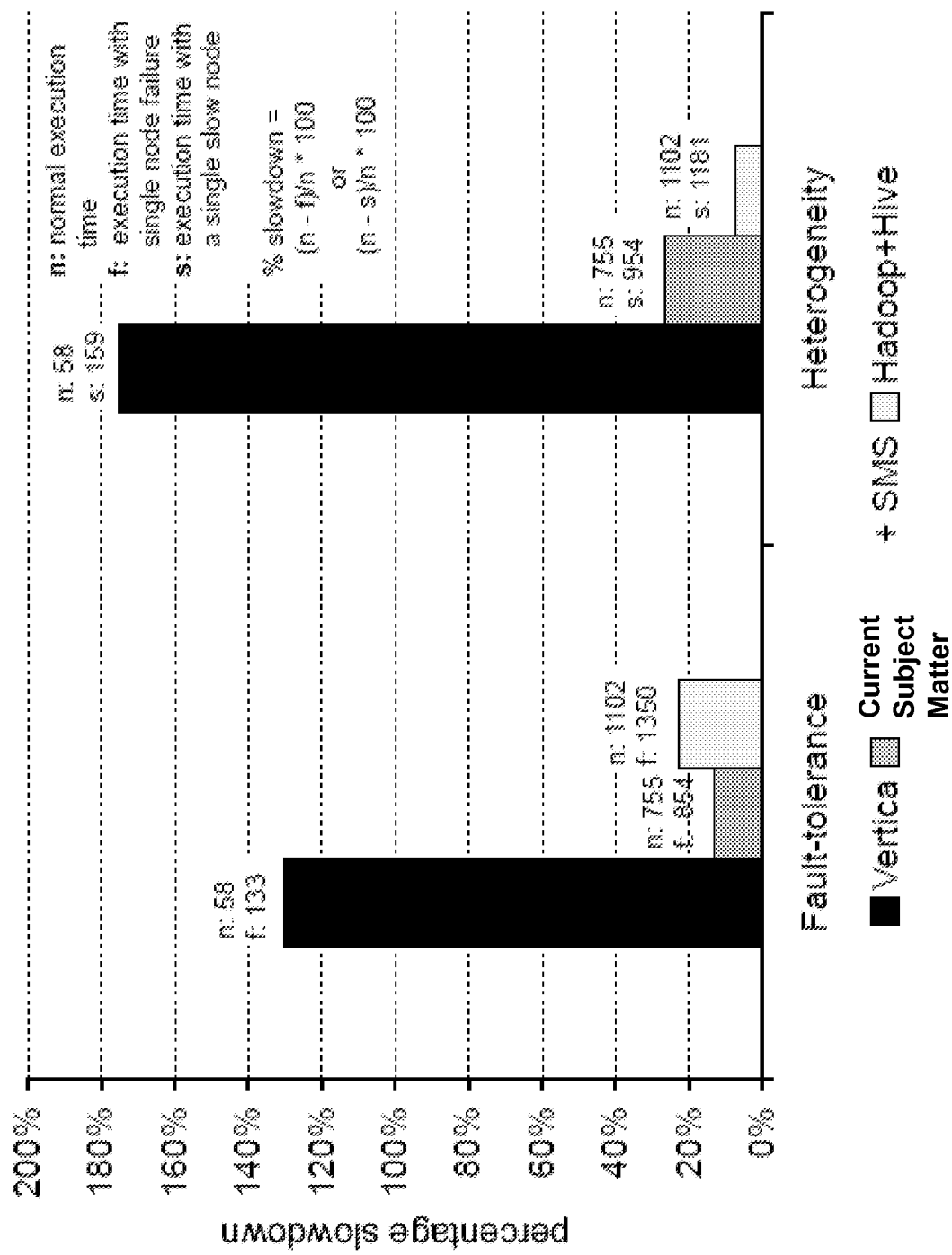

For current subject matter's system, the text processing was expressed in MapReduce, and the current subject matter's system accepted queries in either SQL or MapReduce. The complete contents of the Documents table on each PostgreSQL node were passed into Hadoop with a following SQL query:

SELECT url, contents FROM Documents;

Next, the data was processed using a MR job. An identical MR code was used for both Hadoop and current subject matter's system. FIG. 13 is a plot illustrating results of the UDF aggregation task. As shown in FIG. 10, Hadoop outperformed current subject matter's system as it processes merged files of multiple HTML documents. The current subject matter's system, however, did not lose the original structure of the data by merging many small files into larger ones. DBMS-X and Vertica performed worse than Hadoop-based systems since the input files were stored outside of the database. Moreover, for this task both commercial databases did not scale linearly with the size of the cluster.

Based on the results of these experiments, current subject matter's system approached the performance of the parallel database systems. The current subject matter's system substantially outperformed Hadoop in almost all tasks executed.

Fault Tolerance and Heterogeneous Environment Experimental Examples

As discussed above, in large deployments of shared-nothing machines, individual nodes may experience high rates of failure or slowdown. For parallel databases, query processing time was determined by the time it took for the slowest node to complete its task. In contrast, in MapReduce, each task can be scheduled on any node as long as input data is transferred to or already exists on a free node. Hadoop speculatively redundantly executed tasks that were being performed on a straggler node to reduce the slow node's effect on query time.

Hadoop achieved fault tolerance by restarting tasks of failed nodes on other nodes. The job tracker received heartbeats from task trackers. If a task tracker failed to communicate with the job tracker for a preset period of time, task tracker expiry interval, the job tracker assumed failure and schedules all map/reduce tasks of the failed node on other task trackers. This approach was different from most parallel databases which aborted unfinished queries upon a node failure and restarted the entire query processing (using a replica node instead of the failed node).

By inheriting the scheduling and job tracking features of Hadoop, current subject matter's system yielded similar fault-tolerance and straggler handling properties as Hadoop. To test the effectiveness of current subject matter's system in failure-prone and heterogeneous environments in comparison to Hadoop and Vertica, inventors executed an aggregation query with 2000 groups on a 10-node cluster and set the replication factor to two for all systems. For Hadoop and current subject matter's system, inventors set the task tracker expiry interval to 60 seconds. The following lists system-specific settings for the experiments.

Hadoop (Hive): the HDFS managed the replication of data. The HDFS replicated each block of data on a different node selected uniformly at random.

The current subject matter's system: each node contained twenty 1 GB-chunks of the UserVisits table. Each of these 20 chunks was replicated on a different node selected at random.

Vertica: in Vertica, replication was achieved by keeping an extra copy of every table segment. Each table was hash-partitioned across the nodes and a backup copy was assigned to another node based on a replication rule. On node failure, this backup copy was used until the lost segment was rebuilt.

For fault-tolerance tests, inventors terminated a node at 50% query completion. For Hadoop and the current subject matter's systems, this was equivalent to failing a node when 50% of the scheduled Map tasks were done. For Vertica, this was equivalent to failing a node after 50% of the average query completion time for the given query.

To measure percentage increase in query time in heterogeneous environments, a node was slowed down by running an I/O-intensive background job that randomly sought values from a large file and frequently cleared OS caches. This file was located on the same disk where data for each system was stored. There were no differences observed in percentage slowdown between current subject matter's system with or without SMS planner and between Hadoop with or without Hive. The results of these experiments are shown in FIG. 11. Node failure caused current subject matter's system and Hadoop system to have smaller slowdowns than Vertica.

Vertica's increase in total query execution time was due to the overhead associated with query abortion and complete restart.

In both current subject matter's system and Hadoop system, the tasks of the failed node were distributed over the remaining available nodes that contained replicas of the data. The current subject matter's system outperformed Hadoop. In Hadoop, task trackers, having assigned blocks not local to them, copied the data first (from a replica) before processing. In current subject matter's system, however, processing was pushed into the (replica) database. Since the number of records returned after query processing is less than the raw size of data, current subject matter's system did not experience Hadoop's network overhead on node failure.

In an environment where one node was extremely slow, current subject matter's system and Hadoop experienced less than 30% increase in total query execution time, while Vertica experienced more than a 170% increase in query running time. Vertica waited for the straggler node to complete processing. The current subject matter's system and Hadoop ran speculative tasks on task trackers that completed their tasks. Since the data was chunked (current subject matter's system had 1 GB chunks, Hadoop had 256 MB blocks), multiple task trackers concurrently processed different replicas of unprocessed blocks assigned to the straggler. Thus, the delay due to processing those blocks was distributed across the cluster.

In the above experiments, Hadoop's task scheduler made an assumption that contradicted the current subject matter's system model. In Hadoop, task trackers copied data not local to them from the straggler node or the replica. The current subject matter's system, however, did not move PostgreSQL chunks to new nodes. Instead, the task tracker of the redundant task connected to either the straggler's database or the replica's database. If the task tracker connected to the straggler's database, the straggler needed to concurrently process an additional query leading to further slowdown. Thus, the same feature that caused current subject matter's system to have slightly better fault tolerance than Hadoop, caused a slightly higher percentage slow down in heterogeneous environments for current subject matter's system.

The above examples show that current subject matter's system is capable of approaching performance of parallel database systems, achieving similar scores on fault tolerance, and operating in heterogeneous environments. The current subject matter's system is a hybrid approach to data analysis that achieves performance and efficiency of parallel databases, yields scalability, fault tolerance, and flexibility of MapReduce-based systems.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, i.e., one or more computer programs tangibly embodied in a machine-readable storage device, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Some of the essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

Example embodiments of the methods and components of the current subject matter have been described herein. As noted elsewhere, these example embodiments have been described for illustrative purposes only, and are not limiting. Other embodiments are possible and are covered by the invention. Such embodiments will be apparent to persons skilled in the relevant art(s) based on the teachings contained herein. Thus, the breadth and scope of the current subject matter should not be limited by any of the above-described exemplary embodiments, but should be defined only in accordance with the following claims and their equivalents.

What is claimed:

1. A data processing system, comprising:
a data processing framework having at least one processor and configured to receive a data processing task for processing;
a plurality of database systems having at least another processor, the plurality of database systems being distinct from and are coupled to the data processing framework, wherein the database systems are configured to perform a data processing task, the at least one processor of the data processing framework is distinct from the at least another processor of the plurality of database systems;
wherein the data processing task is configured to be partitioned into a plurality of partitions;
a distributed file system in communication with the data processing framework and the plurality of database systems, and being distinct from each of the data processing framework and the plurality of database systems, the distributed file system optionally stores at least one output data associated with at least one partition of the data processing task being processed by the data processing framework;
each database system in the plurality of database systems is configured to process a partition of the data processing task assigned for processing to that database system by the data processing framework based on at least a processing capacity of that database system, wherein the processing capacity is determined based on at least one of the following: whether that database system is still processing a previously assigned partition of the data processing task, and having each database system determine and provide an indication of its processing capacity to the data processing framework while the data processing task is being processed;
each database system in the plurality of database systems is configured to perform processing of its assigned partition of the data processing task in parallel with another database system in the plurality of database systems processing another partition of the data processing task assigned to the another database system;
wherein the data processing framework is configured to process the at least one-partition of the data processing task;
a storage component in communication with the data processing framework and the plurality database systems, configured to store information about each partition of the data processing task being processed by each database system in the plurality of database systems and the data processing framework, wherein the storage component stores at least one connection parameter specific to each database system and information about at least one data partition property of data stored in at least one database system, wherein, using the at least one connection parameter and the at least one data partition property, processing of each partition of the data processing task is optimized in accordance with at least one requirement of each database system; and
a database connector component configured to provide a communication interface between the plurality of database systems and the data processing framework.

2. The system according to claim 1, further comprising:
a data loader component configured to partition data stored in at least one database system and further configured to manage loading of data into the at least one database system; and
a data processing interface in communication with the data processing framework and the plurality of database systems and configured to receive and translate the data processing task for processing by at least one of the plurality of database systems and data processing framework.

3. The system according to claim 2, wherein the data processing task is a query for processing of data.

4. The system according to claim 3, wherein upon receipt of the query, the database connector component is configured to
connect to at least one database system in the plurality of database systems;
execute the received query; and
output results of the executed query.

5. The system according to claim 1, wherein the information stored by the storage component is selected from a group consisting of: size and location of data, size and location of each data partition, and size and location of at least one replica of data.

6. The system according to claim 3, wherein the storage component is configured to store meta-information about each database system;
wherein the meta-information is selected from a group consisting of: information about at least one data set contained within at least one database system, and information about location of a replica of data.

7. The system according to claim 6, wherein the plurality of database systems are configured to access the storage component to obtain information for processing of a query.

8. The system according to claim 6, wherein the meta-information is an XML file.

9. The system according to claim 3, wherein each database system in the plurality of database systems is configured to be disposed on a node in a cluster containing a plurality of nodes, wherein each node in the cluster of nodes is configured to communicate with a master node disposed in a data processing framework.

10. The system according to claim 9, wherein the data loader component is configured to
re-partition data being loaded into the cluster into a plurality of partitions corresponding to the plurality of nodes in the cluster;
partition each portion in the plurality of partitions into a plurality of smaller partitions for storing in the at least one database system on the at least node;
perform bulk-loading of the plurality of smaller partitions of data into the at least one database system on the at least one node.

11. The system according to claim 10, wherein the data loader component further comprises a global hasher component configured to re-partition the data into the plurality of partitions corresponding to the plurality of nodes in the cluster;

a local hasher component configured to partition each partition in the plurality of partitions into the plurality of smaller partitions using a predetermined maximum smaller partition size.

12. The system according to claim 10, further comprising a query submission interface in communication with the master node and configured to allow submission of a query to the data processing system.

13. The system according to claim 10, wherein upon receipt of a query, the query processing interface is configured to parse the query;

communicate with the storage component to determine a predetermined data storage structure in the at least one database system;

generate a query execution plan using at least one relational operator;

optimize the query execution plan by generating a specific order in which the relational operators process the data;

execute the query in accordance with the optimized query execution plan.

14. The system according to claim 13, wherein the at least one relational operator is configured to process data and is selected from a group consisting of: a filter operator, a select operator, a join operator, an aggregation operator, and a repartition operator;

wherein each operator is configured to process the data prior to the next operator processing the data.

15. The system according to claim 14, wherein the specific order of relational operator includes processing data using the repartition operator prior to processing data using the join operator.

16. The system according to claim 3, wherein the query is an SQL query.

17. The system according to claim 3, wherein the data processing framework includes at least one map processing phase during which the received data processing task is partitioned into the plurality of partitions for distribution to at least one database system in the plurality of database systems, and at least one reduce processing phase during which data generated as a result of the at least one map processing phase is aggregated and, optionally, at least one operation is performed on the aggregated data.

18. The system according to claim 17, wherein the query is a query performed by the data processing framework having the at least one map processing phase and the at least one reduce processing phase.

19. A computer implemented method for processing data using a data processing system having a data processing framework having at least one processor, a plurality of database systems having at least another processor, the plurality of database systems being distinct from and are coupled to the data processing framework, the at least one processor of the data processing framework is distinct from the at least another processor of the plurality of database systems, a distributed file system in communication with the data processing framework and the plurality of database systems, and being distinct from each of the data processing framework and the plurality of database systems, the distributed file system optionally stores at least one output data associated with at least one partition of the data processing task being processed by the data processing framework, and a storage component in communication with the data processing framework and the plurality database systems, the method comprising:

receiving a data processing task for processing using the data processing framework;

partitioning the data processing task into a plurality of partitions;

determining and assigning, using the data processing framework, a partition of the data processing task to at least one database system in the plurality of database systems for processing, wherein the data processing framework assigns partitions of data processing task to database systems based on at least a processing capacity of a database system in the plurality of database systems, wherein the processing capacity is determined based on at least one of the following: whether that database system is still processing a previously assigned partition of the data processing task, and having each database system determine and provide an indication of its processing capacity to the data processing framework while the data processing task is being processed;

processing, using the at least one database systems, the assigned partitions in parallel with processing of at least another partition of the data processing task by another database system in the plurality of database systems;

processing at least one partition of the data processing task using the data processing framework; and using the storage component, storing information about each partition of the data processing task being processed by each database system in the plurality of database systems and the data processing framework, wherein the storage component stores at least one connection parameter specific to each database system and information about at least one data partition property of data stored in at least one database system, wherein, using the at least one connection parameter and the at least one data partition property, processing of each partition of the data processing task is optimized in accordance with at least one requirement of each database system;

wherein the data processing system further includes a database connector component configured to provide a communication interface between the plurality of database systems and the data processing framework.

20. The method according to claim 19, wherein the data processing system further includes a data loader component configured to partition data stored in at least one database system and further configured to manage loading of data into the at least one database system; and a data processing interface in communication with the data processing framework and the plurality of database systems and configured to receive and translate the data processing task for processing by at least one of the plurality of database systems and data processing framework.

21. The method according to claim 20, wherein the data processing task is a query for processing of data.

22. The method according to claim 21, further comprising using the database connector component, upon receipt of the query connecting to at least one database system in the plurality of database systems;

executing the received query; and outputting results of the executed query.

23. The method according to claim 19, wherein the information stored by the storage component is selected from a group consisting of: size and location of data, size and location of each data partition, and size and location of at least one replica of data.

24. The method according to claim 21, further comprising
using the storage component, storing meta-information about each database system;
wherein the meta-information is selected from a group consisting of: information about at least one data set contained within at least one database system, and information about location of a replica of data.

25. The method according to claim 24, further comprising
using the plurality of database systems, accessing the storage component to obtain information for processing of a query.

26. The method according to claim 24, wherein the meta-information is an XML file.

27. The method according to claim 21, wherein each database system in the plurality of database systems is configured to be disposed on a node in a cluster containing a plurality of nodes, wherein each node in the cluster of nodes is configured to communicate with a master node disposed in a data processing framework.

28. The method according to claim 27, further comprising
using the data loader component
re-partitioning data being loaded into the cluster into the plurality of partitions corresponding to the plurality of nodes in the cluster;
partitioning each portion in the plurality of partitions into a plurality of smaller partitions for storing in the at least one database system on the at least node;
bulk-loading of the plurality of smaller partitions of data into the at least one database system on the at least one node.

29. The method according to claim 28, wherein the data loader component further comprises
a global hasher component configured to re-partition the data into the plurality of partitions corresponding to the plurality of nodes in the cluster;
a local hasher component configured to partition each partition in the plurality of partitions into the plurality of smaller partitions using a predetermined maximum smaller partition size.

30. The method according to claim 28, wherein the data processing system further includes a query submission interface in communication with the master node and configured to allow submission of a query to the data processing system.

31. The method according to claim 28, further comprising
using the query processing interface, upon receipt of a query
parsing the query;
communicating with the storage component to determine a predetermined data storage structure in the at least one database system;
generating a query execution plan using at least one relational operator;
optimizing the query execution plan by generating a specific order in which the relational operators process the data;
executing the query in accordance with the optimized query execution plan.

32. The method according to claim 31, wherein the at least one relational operator is configured to process data and is selected from a group consisting of: a filter operator, a select operator, a join operator, an aggregation operator, and a repartition operator;
wherein each operator is configured to process the data prior to the next operator processing the data.

33. The method according to claim 32, wherein the specific order of relational operator includes processing data using the repartition operator prior to processing data using the join operator.

34. The method according to claim 21, wherein the query is an SQL query.

35. The method according to claim 21, wherein the data processing framework includes at least one map processing phase during which the received data processing task is partitioned into the plurality of partitions for distribution to at least one database system in the plurality of database systems, and at least one reduce processing phase during which data generated as a result of the at least one map processing phase is aggregated and, optionally, at least one operation is performed on the aggregated data.

36. The method according to claim 35, wherein the query is a query performed by the data processing framework having the at least one map processing phase and the at least one reduce processing phase.

37. A non-transitory computer program product, tangibly embodied in a computer-readable medium, the computer program product being operable to cause a data processing system having a data processing framework, a plurality of database systems being distinct from and are coupled to the data processing framework, the at least one processor of the data processing framework is distinct from the at least another processor of the plurality of database systems, a distributed file system in communication with the data processing framework and the plurality of database systems, and being distinct from each of the data processing framework and the plurality of database systems, the distributed file system optionally stores at least one output data associated with at least one partition of the data processing task being processed by the data processing framework, and a storage component in communication with the data processing framework and the plurality database systems, to perform operations comprising:
receiving a data processing task for processing using the data processing framework;
partitioning the data processing task into a plurality of partitions;
determining and assigning, using the data processing framework, a partition of the data processing task to at least one database system in the plurality of database systems for processing, wherein the data processing framework assigns partitions of data processing task to database systems based on at least a processing capacity of a database system in the plurality of database systems, wherein the processing capacity is determined based on at least one of the following: whether that database system is still processing a previously assigned partition of the data processing task, and having each database system determine and provide an indication of its processing capacity to the data processing framework while the data processing task is being processed;
processing, using the at least one database systems, the assigned partitions in parallel with processing of at least another partition of the data processing task by another database system in the plurality of database systems;

processing at least one partition of the data processing task using the data processing framework; and using the storage component, storing information about each partition of the data processing task being processed by each database system in the plurality of database systems and the data processing framework, wherein the storage component stores at least one connection parameter specific to each database system and information about at least one data partition property of data stored in at least one database system, wherein, using the at least one connection parameter and the at least one data partition property, processing of each partition of the data processing task is optimized in accordance with at least one requirement of each database system;

wherein the data processing system further includes a database connector component configured to provide a communication interface between the plurality of database systems and the data processing framework.

38. The system according to claim 1, wherein the data processing framework assigns a second partition of the data processing task to the database system when the data processing task completes processing of a first partition of the data processing task assigned to the database system by the data processing framework, wherein the first partition is processed by the database system before the second partition.

39. The method according to claim 19, wherein the data processing framework assigns a second partition of the data processing task to the database system when the data processing task completes processing of a first partition of the data processing task assigned to the database system by the data processing framework, wherein the first partition is processed by the database system before the second partition.

40. The computer program product according to claim 37, wherein the data processing framework assigns a second partition of the data processing task to the database system when the data processing task completes processing of a first partition of the data processing task assigned to the database system by the data processing framework, wherein the first partition is processed by the database system before the second partition.

* * * * *